(12) United States Patent
Ben Simhon et al.

(10) Patent No.: US 10,891,558 B2
(45) Date of Patent: Jan. 12, 2021

(54) CREATION OF METRIC RELATIONSHIP GRAPH BASED ON WINDOWED TIME SERIES DATA FOR ANOMALY DETECTION

(71) Applicant: Anodot Ltd., Ra'anana (IL)

(72) Inventors: Yoni Yom Tov Ben Simhon, Natanya (IL); Ira Cohen, Reut (IL)

(73) Assignee: Anodot Ltd., Ra'anana (IL)

( * ) Notice: Subject to any disclaimer, the term of this patent is extended or adjusted under 35 U.S.C. 154(b) by 1350 days.

(21) Appl. No.: 15/002,260

(22) Filed: Jan. 20, 2016

(65) Prior Publication Data
US 2016/0210556 A1  Jul. 21, 2016

Related U.S. Application Data

(60) Provisional application No. 62/106,207, filed on Jan. 21, 2015.

(51) Int. Cl.
*G06N 20/00* (2019.01)
*G06N 3/08* (2006.01)
*G06F 11/34* (2006.01)
*G06F 11/07* (2006.01)
*H04L 29/06* (2006.01)

(52) U.S. Cl.
CPC ............ *G06N 20/00* (2019.01); *G06N 3/08* (2013.01); *G06F 11/07* (2013.01); *G06F 11/3452* (2013.01); *G06F 2201/875* (2013.01); *H04L 63/1425* (2013.01)

(58) Field of Classification Search
None
See application file for complete search history.

(56) References Cited

U.S. PATENT DOCUMENTS 7,448,084 B1 * 11/2008 Apap .................... G06F 21/552
                                              726/24
9,886,521 B2 *  2/2018 Wu ...................... G06F 16/9024
(Continued)

OTHER PUBLICATIONS

Wagner, N. et al. (2008). "An Analysis of Adaptive Windowing for Time Series Forecasting in Dynamic Environments: Further Tests of The DyFor GP Model". GECCO'08, Jul. 12-16, 2008. ACM. pp. 1657-1664. (Year: 2008).*
Bara, A. (2013). "DeADA Self-adaptive anomaly detection dataflow architecture". MEng Individual Project, Department of Computing, Imperial College London. 101 pages. (Year: 2013).*
Stober, S. et al. (2014). "Using Convolutional Neural Networks to Recognize Rhythm Stimuli from Electroencephalography Recordings." Advances in neural information processing systems. 9 pages. (Year: 2014).*

(Continued)

*Primary Examiner* — Kamran Afshar
*Assistant Examiner* — Benjamin J Buss
(74) *Attorney, Agent, or Firm* — Harness, Dickey & Pierce, P.L.C.

(57) ABSTRACT

A system includes a windowing module that divides time series data for each metric into portions. Each portion corresponds to a respective window of time. A hash module calculates a hash value for each of the portions for each of the metrics. An identification module compares the hash values for each pair of metrics and, for a selected pair of metrics, counts how many windows of time in which the hash values of the selected pair of metrics are equal. A pair is identified as a candidate pair in response to the count exceeding a threshold. A metric graph module creates a first edge in a graph based on the candidate pair of metrics. Each of the metrics is a node in the graph and direct relationships between each pair of the metrics are edges in the graph. An anomaly combination module analyzes an anomaly condition based on the graph.

26 Claims, 15 Drawing Sheets

(56) References Cited

U.S. PATENT DOCUMENTS

| | | | | |
|---|---|---|---|---|
| 2006/0053295 | A1* | 3/2006 | Madhusudan | H04L 63/145 713/181 |
| 2008/0167837 | A1* | 7/2008 | Basak | G06K 9/00503 702/179 |
| 2011/0119100 | A1* | 5/2011 | Ruhl | G06Q 10/06 705/7.11 |
| 2012/0053925 | A1* | 3/2012 | Geffin | H05K 7/1498 703/21 |
| 2012/0137367 | A1* | 5/2012 | Dupont | G06F 21/00 726/25 |
| 2012/0158527 | A1* | 6/2012 | Cannelongo | H04N 21/2668 705/14.73 |
| 2013/0110761 | A1* | 5/2013 | Viswanathan | G06N 20/00 706/52 |
| 2014/0053025 | A1* | 2/2014 | Marvasti | G06F 11/079 714/37 |
| 2014/0096249 | A1* | 4/2014 | Dupont | G06F 21/552 726/23 |
| 2015/0033086 | A1* | 1/2015 | Sasturkar | G06F 16/26 714/57 |
| 2015/0199224 | A1* | 7/2015 | Mihnev | H04L 43/08 714/37 |
| 2015/0254370 | A1* | 9/2015 | Sexton | G06F 19/00 707/798 |
| 2015/0316666 | A1* | 11/2015 | Beroza | G01V 1/30 702/15 |
| 2016/0021181 | A1* | 1/2016 | Ianakiev | G06Q 10/10 709/204 |
| 2016/0065611 | A1* | 3/2016 | Fakeri-Tabrizi | H04L 63/1425 726/23 |
| 2016/0188396 | A1* | 6/2016 | Sonalker | G06F 11/0739 714/37 |
| 2016/0371316 | A1* | 12/2016 | Okanohara | G06N 7/005 |
| 2017/0032221 | A1* | 2/2017 | Wu | A61B 7/04 |
| 2017/0076474 | A1* | 3/2017 | Fu | G06T 3/0093 |
| 2017/0206464 | A1* | 7/2017 | Clayton | G06N 3/0445 |
| 2018/0027004 | A1* | 1/2018 | Huang | H04L 43/08 726/23 |

OTHER PUBLICATIONS

Qi, Y. et al. (2014). "Robust Deep Network with Maximum Correntropy Criterion for Seizure Detection". Neural Computation for Rehabilitation, vol. 2014 |Article ID 703816 | 10 pages | https://doi.org/10.1155/2014/703816 (Year: 2014).*

Raymond, J.W. et al. (2002). "RASCAL: Calculation of Graph Similarity using Maximum Common Edge Subgraphs". Computer Journal, 45(6), 631-44. doi:http://dx.doi.org/10.1093/comjnl/45.6.631 (Year: 2002).*

Sanjuas-Cuxart, J. (2009). "Counting flows over sliding windows in high speed networks". Networking 2009. Proceedings 8th International IFIP-TC 6 Networking Conference: 79-91. Springer-Verlag. doi:http://dx.doi.org/10.1007/978-3-642-01399-7_7 (Year: 2009).*

Wulsin, D.F. et al. (2011). "Modeling electroencephalography waveforms with semi-supervised deep belief nets: fast classification and anomaly measurement". Journal of neural engineering 8.3 (2011): 036015. (Year: 2011).*

Xie, J. et al. (2015). "Deepshape: Deep learned shape descriptor for 3d shape matching and retrieval." Proceedings of the IEEE Conference on Computer Vision and Pattern Recognition (CVPR), Jun. 2015. DOI: 10.1109/CVPR.2015.7298732 (Year: 2015).*

Suk, H-I. et al. (2015). "Latent feature representation with stacked auto-encoder for AD/MCI diagnosis." Brain Structure and Function 220.2 (2015): 841-859. DOI 10.1007/s00429-013-0687-3 (Year: 2015).*

Stacked Autoencoders, Ufldl, http://ufldl.stanford.edu/wiki/index.php/Stacked_Autoencoders, 6 pages, Apr. 7, 2013.

Bayardo, Roberto J., et al., Scaling Up All Pairs Similarity Search, WWW Conference 2007, Track: Data Mining, Session: Similarity Search, 10 pages, May 8-12, 2007.

How does one determine the number of clusters that are hidden in a given data set?, Quora, http://www.quora.com/Howdoesonedeterminethenumberofclustersthatarehiddeninagivendataset, 4 pages, Jan. 21, 2015.

U.S. Appl. No. 14/950,357, filed Nov. 24, 2015, Yoni Yom Tov Ben Simhon.

* cited by examiner

CREATION OF METRIC RELATIONSHIP GRAPH BASED ON WINDOWED TIME SERIES DATA FOR ANOMALY DETECTION

CROSS-REFERENCE TO RELATED APPLICATIONS

This application claims the benefit of U.S. Provisional Application No. 62/106,207, filed on Jan. 21, 2015. The entire disclosure of the application referenced above is incorporated herein by reference.

FIELD

The present disclosure relates to systems and methods for inferentially identifying relationships between monitored metrics.

BACKGROUND

Modest computing systems can have hundreds or even thousands of processor cores, memory arrays, storage arrays, networking ports, and additional peripherals. In large-scale computing systems, such as a data center or supercomputer, the number of processor cores can be in the hundreds of thousands to millions. Each hardware component may have a number of associated parameters such as clock speed, temperature, idle time, etc. Some of these parameters may be reported and/or measured by the computing system itself. Other parameters may be monitored by an associated monitoring system.

These parameters are referred to in this disclosure as metrics and may be defined at a component level, such as available space on a given magnetic disk, or may be at a subsystem level, such as amount of available storage space in a storage area network. Metrics may also be defined at a system level, such as number of transactions per second in a database or time delay in returning results for a query. A monitoring system for a large computing system may measure and/or collect thousands, millions, or even billions of time-series metrics (that is, the metrics are measured over time). Monitoring metrics allows for problems to be quickly identified and resolved, hopefully before affecting business results, such as losing users, missing revenue, decreasing productivity, etc.

Currently, problems are detected by skilled system administrators who manually create rules to generate alerts for specific metrics. For example, an administrator may set a threshold for available disk space such that an alert will be generated when available disk space decreases below 10% of total disk space. For many metrics, the "correct" threshold may not be known a priori. Instead, the administrator may have to observe the metric over time and infer a threshold based on the historical metric values.

Administrators may watch scores of metrics, such as in a dashboard, and use experience and intuition to determine if any of the metrics indicate the onset of a problem. However, regardless of how many computer screens are used, the number of metrics that can be visually tracked is limited.

Further, manually setting rules is a tedious and difficult task. For example, some values of a metric may be associated with problems at some times but with normal operation at others. Sometimes this inconsistency can be resolved by combining metrics. For example, an alert can be defined by processor utilization being above a first threshold and memory utilization being above a second threshold. However, these thresholds may vary over time and their interrelationship may vary depending on tasks the system is performing.

When combining metrics, some relationships may be well understood by the administrator but others are less apparent, escaping the administrator's notice. Knowing whether metrics are related to each other may be important for detection and root-cause diagnosis of problems, for capacity planning, and in general for understanding dependencies between the different components that make up the system.

Most monitoring systems today rely on receiving the relationship between the metrics from an external entity: manual configuration of experts or a model of the system, its components, and their relationships, such as a CMDB (configuration management database) in IT Operations. The first is an extremely cumbersome and time-consuming task when millions of metrics are involved, while the second assumes that such an external model of the system exists—an assumption that is often broken.

Because of the limitations of visual and programmatic oversight by human administrators, big data principles have been applied to the problem of monitoring systems. Automated processes may evaluate every single metric, a significant advance compared to the tiny fraction that a human administrator can review, and determine normal historical behavior for each metric. However, automated processes don't have the insight and experience of an administrator, and this insight generally has to be manually taught to the system.

Machine learning is able to calculate statistics of values of the metric over time and declare that an anomaly is present when the metric deviates from algorithmically-determined behavior. Of course, determining this behavior algorithmically means that false positives will occur as metrics drift over time at a slow rate and various circumstances, such as bursts of activity, lead to fluctuation at higher rates.

When a monitoring system is collecting millions of metrics, the number of false positives, even with a very low false positive rate, can quickly become noise from which a human administrator cannot detect the signal. As just one example, a recent security breach at a major retailer was detected by security monitoring software. However, these detections were mixed in with so many false positives that the security software's detection of the breach was only recognized after the breach was reported in the press.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a windowing module configured to divide, for each metric of a plurality of metrics, time series data for values of the metric into a plurality of time series portions, each corresponding to a respective window of time. The system includes a hash module configured to calculate a hash value for each of the time series portions for each of the plurality of metrics. The system includes a candidate identification module configured to (i) compare the hash values for each pair of metrics from the plurality of metrics, (ii) for a selected pair of metrics, count for how many windows of time the hash values of the selected pair of metrics are equal to each other, and (iii) identify the pair of metrics as a candidate pair in response to the count exceeding a threshold. The system includes a metric relationship graph creation module configured to selectively create a first edge in a graph based on the candidate pair of metrics. Each of the plurality of metrics is a node in the graph and direct relationships between each pair of the plurality of metrics are edges in the graph. The system includes an anomaly combination module configured to analyze an anomaly condition based on the graph.

In other features, the system includes a correlation module configured to compute a similarity value between the candidate pair of metrics. In other features, the similarity value is one of a Euclidean distance, a hamming distance, a cosine distance, and a correlation coefficient. In other features, the metric relationship graph creation module is configured to only create the first edge in the graph in response to the similarity value exceeding a threshold. In other features, the windows of time are equal in length.

In other features, the hash module computes hash values using locality-sensitive hashing. In other features, the system includes a conditioning module logically positioned prior to the windowing module and configured to apply a low-pass filter to the time series data for the metrics and to remove long-term trends from the time series data for the metrics. In other features, the conditioning module is further configured to normalize the time series data for the metrics. In other features, the graph is undirected.

In other features, the system includes a stacked autoencoder module configured to (i) train a stacked autoencoder using each of the time series portions of each of the plurality of metrics and (ii) to identify output nodes in the stacked autoencoder activated by each of the time series portions of each of the plurality of metrics. The system includes a concatenation module configured to, for each of the plurality of metrics, concatenate a representation of activated output nodes for each of the time series portions of the metric. The system includes a similarity identification module configured to compare each possible pair of the plurality of metrics. The similarity identification module only computes a similarity value for a pair of metrics if a preliminary indication of the similarity value exceeds a first threshold. The system includes a combination module configured to, for a selected pair of metrics, combine the similarity value from the similarity identification module with the similarity value from the correlation module to create an overall similarity value. The metric relationship graph creation module is configured to create the first edge in the graph only when the overall similarity value exceeds a second threshold. In other features, the combination module is configured to create the overall similarity value by averaging the similarity value from the similarity identification module with the similarity value from the correlation module.

A system includes a windowing module configured to divide, for each metric of a plurality of metrics, time series data for values of the metric into a plurality of time series portions, each corresponding to a respective window of time. The system includes a stacked autoencoder module configured to (i) train a stacked autoencoder using each of the time series portions of each of the plurality of metrics and (ii) to identify output nodes in the stacked autoencoder activated by each of the time series portions of each of the plurality of metrics. The system includes a concatenation module configured to, for each of the plurality of metrics, concatenate a representation of activated output nodes for each of the time series portions of the metric. The system includes a similarity identification module configured to compare each possible pair of the plurality of metrics. The similarity identification module only computes a similarity value for a pair of metrics if a preliminary indication of the similarity value exceeds a first threshold. The system includes a metric relationship graph creation module configured to selectively create a first edge in a graph based on a pair of the plurality of metrics whose similarity value exceeds a second threshold. Each of the plurality of metrics is a node in the graph and direct relationships between each pair of the plurality of metrics are edges in the graph. The system includes an anomaly combination module configured to analyze an anomaly condition based on the graph. In other features, the first threshold and the second threshold are equal.

A method includes dividing, for each metric of a plurality of metrics, time series data for values of the metric into a plurality of time series portions, each corresponding to a respective window of time. The method includes calculating a hash value for each of the time series portions for each of the plurality of metrics. The method includes comparing the hash values for each pair of metrics from the plurality of metrics. The method includes, for a selected pair of metrics, counting for how many windows of time the hash values of the selected pair of metrics are equal to each other. The method includes identifying the pair of metrics as a candidate pair in response to the count exceeding a threshold. The method includes selectively creating a first edge in a graph based on the candidate pair of metrics. Each of the plurality of metrics is a node in the graph and direct relationships between each pair of the plurality of metrics are edges in the graph. The method includes analyzing an anomaly condition based on the graph.

In other features, the method includes computing a first similarity value between the candidate pair of metrics. In other features, the first similarity value is one of a Euclidean distance, a hamming distance, a cosine distance, and a correlation coefficient. In other features, the first edge is only created in the graph in response to the first similarity value exceeding a threshold. In other features, the windows of time are equal in length. In other features, the hash values are computed using locality-sensitive hashing. In other features, the method includes applying a low-pass filter to the time series data for the metrics and removing long-term trends from the time series data for the metrics. In other features, the method includes normalizing the time series data for the metrics. In other features, the graph is undirected.

In other features, the method includes training a stacked autoencoder using each of the time series portions of each of the plurality of metrics. The method includes identifying output nodes in the stacked autoencoder activated by each of the time series portions of each of the plurality of metrics. The method includes, for each of the plurality of metrics, concatenating a representation of activated output nodes for each of the time series portions of the metric. The method includes comparing each possible pair of the plurality of metrics. The method includes computing a second similarity value for a pair of metrics only if a preliminary indication of the second similarity value exceeds a first threshold. The method includes, for a selected pair of metrics, combining the first similarity value with the second similarity value to create an overall similarity value. The method includes creating the first edge in the graph only when the overall similarity value exceeds a second threshold. In other features, the overall similarity value is created by averaging the first similarity value and the second similarity value.

A method includes dividing, for each metric of a plurality of metrics, time series data for values of the metric into a plurality of time series portions, each corresponding to a respective window of time. The method includes training a stacked autoencoder using each of the time series portions of each of the plurality of metrics. The method includes identifying output nodes in the stacked autoencoder activated by each of the time series portions of each of the plurality of metrics. The method includes, for each of the plurality of metrics, concatenating a representation of activated output nodes for each of the time series portions of the metric. The method includes comparing each possible pair of the plurality of metrics. The method includes computing a similarity value for a pair of metrics only if a preliminary indication of the similarity value exceeds a first threshold. The method includes selectively creating a first edge in a graph based on a pair of the plurality of metrics whose similarity value exceeds a second threshold. Each of the plurality of metrics is a node in the graph and direct relationships between each pair of the plurality of metrics are edges in the graph. The method includes analyzing an anomaly condition based on the graph. In other features, the first threshold and the second threshold are equal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
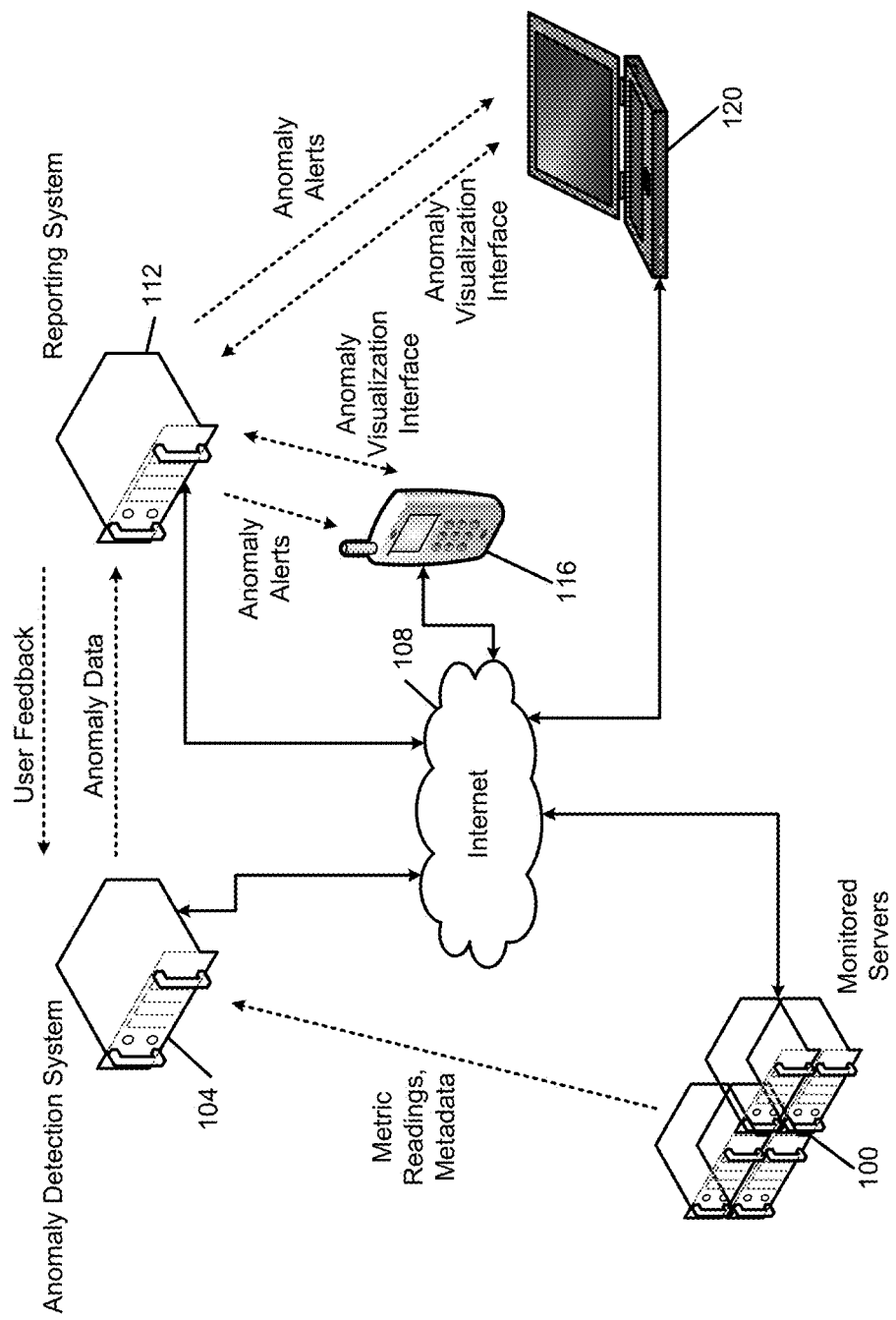
FIG. 1 is a graphical depiction of example elements in a monitored system and a corresponding monitoring system.

The present disclosure describes elements of a system and method that automatically detect significant abnormal behaviors across multiple metrics. In various implementations, much of the data regarding the metrics, their significance, their relationships, their normal and abnormal behaviors, etc., are inferred automatically. This minimizes the burden on system administrators, allowing an anomaly detection system according to the present disclosure to be quickly and simply integrated with existing monitoring systems. The anomaly system may allow anomalies to be more quickly identified and corrected. In some instances, the anomaly can be remedied before any downtime is suffered. For example, additional resources may be brought online to accommodate an increase in capacity or a decrease in performance. In another example, physical maintenance, such as on a printer, may be performed based on a detected anomaly prior to any components of the printer actually failing.

For example, the names of all the monitored metrics may be provided to the anomaly detection system and then the values of each of the metrics are provided as those values are measured. The anomaly detection system may require no additional data beyond the names and values of the metrics. Further, in various implementations the names may have no predefined meaning to the anomaly detection system, serving only to label the metrics for identification by users of the anomaly detection system and to infer similarity of the metrics based on similarity of the names.

A dependency graph describes the relationship between the metrics and may also indicate the strength of the relationships. Each metric may be represented in the graph as a node and each edge between two nodes signifies that the metrics of those nodes are related in some way. The weight on the edge describes the strength of that relationship. In one example, the weight is a number between zero and one, with the weight increasing toward one when the metrics are more closely related and decreasing toward zero when the metrics are less closely related. For example, the weight may be based on the absolute value of the statistical correlation between the metrics. In some implementations, a weight of zero may not exist because an edge with a weight of zero may simply be removed.

The present disclosure describes how to infer the dependency graph without any additional information beyond the names and values of the metrics. As described in more detail below, multiple approaches may be used to synthesize weights between metrics in the dependency graph. For example, similarities between the values of metrics, similarities between frequency domain components of metrics, similarities between timing of abnormalities of metrics, and similarities between the names of the metrics may be evaluated. The various weights determined by the different approaches may be stored individually and/or may be combined into a single overall weight for the relationship between two metrics.

The overall weight may be a mathematical combination of weights from individual approaches but may also be based on certain logical operations. For example, if the names of two metrics are similar but no similarity was detected in either the values or the abnormality timing of the two metrics, the edge between those two nodes inferred by name similarity may be removed entirely from the dependency graph. In various implementations, setting a weight to zero is equivalent to removing the edge from the dependency graph.

For example only, the dependency graph may be described as a sparse upper triangular matrix, where the rows correspond one-to-one with the entire set of metrics and where the columns also correspond one-to-one to the set of metrics. The values contained within the matrix indicate the weight of an edge between the two metrics. The matrix may be upper triangular when the edges in the dependency graph are non-directional. In other words, no information indicates whether metric A depends from (or, for example, is caused by) metric B or vice versa; instead, the graph simply indicates the strength of the relationship between metric A and metric B. The matrix may be described as sparse because a zero value is located in the matrix for any pair of metrics not joined by an edge and in many environments there will be more zero values than non-zero values.

Based on the values received for a metric, the anomaly detection system automatically establishes a baseline for normal behavior of the metric. The anomaly detection system then determines when deviations from the baseline have occurred, which are labeled as anomalies, and characterizes the anomalies of the metric. This characterization is referred to as learning the metric's abnormal behavior.

Then, as values for the metric continued to be received, the anomaly detection system determines whether an anomaly is present for a metric and determines a significance of the anomaly based on the characterized abnormal behavior. A score may be assigned to the anomaly, which represents the significance of the anomaly. Other metrics also experiencing anomalies may be combined with the metric being evaluated. Metrics may be combined according to the dependency graph and the weights connecting the metrics in the dependency graph may be used to determine an overall score for the combined anomaly.

In FIG. 1, a set of monitored servers 100 is shown as an example of infrastructure to be monitored. The monitored servers 100 may include production servers as well as monitoring servers that measure metrics of the production servers. Some metrics may be generated and reported automatically while others are measured externally.

Although depicted as computing servers, monitored hardware can include not just computers but other hardware and software capable of instrumentation. For example, industrial control systems, factory automation, etc., may all generate and/or be observed to generate a number of metrics that can be evaluated by an anomaly detection system 104. Further, even within computing hardware, the monitored servers 100 could alternatively or additionally include desktop computers, smartphones, tablets, dedicated hardware (storage area networks, voice over IP systems), etc.

The monitored servers 100 may be physical servers, virtual servers, hosted servers, etc. In one example, the monitored servers 100 may be Elastic Cloud Compute (EC2) instances in Amazon Web Services (AWS). As shown in FIG. 1 with a dashed line, metric readings are transmitted from the monitored servers 100 to the anomaly detection system 104. Metadata about the metrics is also provided from the monitored servers 100 to the anomaly detection system 104. In various implementations, the metadata may be limited to names of the metrics, while in other implementations the metadata may also include data types of the metrics (such as string, integer, floating point, Boolean, etc.) and units (such as milliseconds per second, megabytes per second, etc.).

Physically, the metric readings may be transported over the Internet, represented at 108, or over any other communication system. The metric readings will generally be encrypted when sent over the Internet 108, such as by using a Virtual Private Network (VPN) or some other secure transport facility such as Secure File Transfer Protocol (SFTP) or Hypertext Transfer Protocol Secure (HTTPS). In configurations where the monitored servers 100 and the anomaly detection system 104 are all AWS instances, data may be unencrypted, as it may be confined to Amazon's internal network.

The anomaly detection system 104 analyzes the metric readings and, as described in more detail below, characterizes normal and abnormal behavior and determines the significance of detected anomalies. This anomaly data is transmitted to a reporting system 112, which can generate anomaly alerts to system administrators. For example, these anomaly alerts may be sent via text message to a mobile phone 116 or by email or through a monitoring dashboard interface to a laptop 120.

The anomaly detection system 104 and the reporting system 112 may be integrated together and simply referred to as the anomaly detection system 104. They are shown separately in FIG. 1 simply for ease of illustrating their respective functionality. The anomaly detection system 104 and the reporting system 112 may be hosted on dedicated hardware or in cloud computing instances. The data they store may also be stored in dedicated hardware or in cloud storage, such as AWS Simple Storage Service (S3) and/or AWS Elastic Block Store (EBS).

The anomaly detection system 104 and the reporting system 112 may be owned and operated by the provider of the anomaly detection system 104 through a service agreement. Alternatively, the anomaly detection system 104 and the reporting system 112 may be purchased as hardware or as virtual machines and then operated by the owner of the monitored servers 100.

Figure 3:
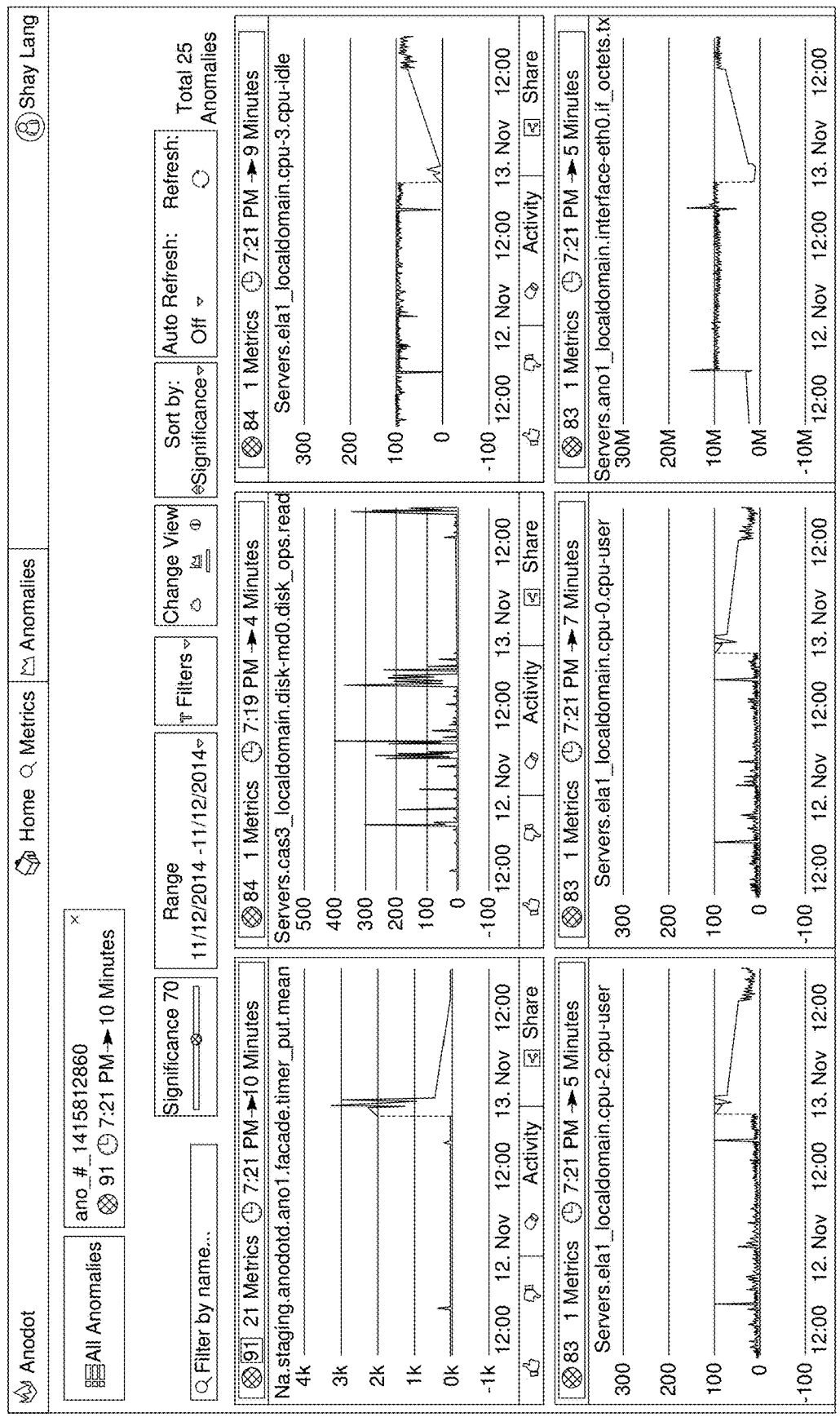
FIG. 3 is an example user interface showing six detected anomalies.

The mobile phone 116 interacts with an anomaly visualization interface presented by the reporting system 112. This interface may allow active anomalies to be seen in real time and may allow prior anomalies to be evaluated. An example interface screen for the anomaly visualization interface is shown in FIG. 3.

A user of the mobile phone 116 may provide feedback on various reported anomalies to the reporting system 112. For example, this feedback may identify an anomaly as representing a false positive or a true positive. A false positive means that the anomaly does not actually represent anomalous behavior or at least does not indicate an actual or impending issue. Meanwhile, a true positive would mean that the detected anomaly corresponded with some issue with the monitored servers 100.

The laptop 120 may also access the anomaly visualization interface. The interface may be tailored to different screen sizes such as by limiting the information provided to the mobile phone 116 to more significant information than might be shown to the laptop 120. The mobile phone 116 and the laptop 120 may be owned by system administrators employed by the owner of the monitored servers 100 or may be owned by the provider of the anomaly detection system 104 or a third party. Such a third party could monitor for anomalies and report to the owner of the monitored servers 100 when a problem appears to be imminent or ongoing.

The detected anomalies may signify, and be used to examine, a wide variety of issues. These issues include uptime and reliability, security, responsiveness to users, efficient resource usage, business trends, etc.

Figure 2:
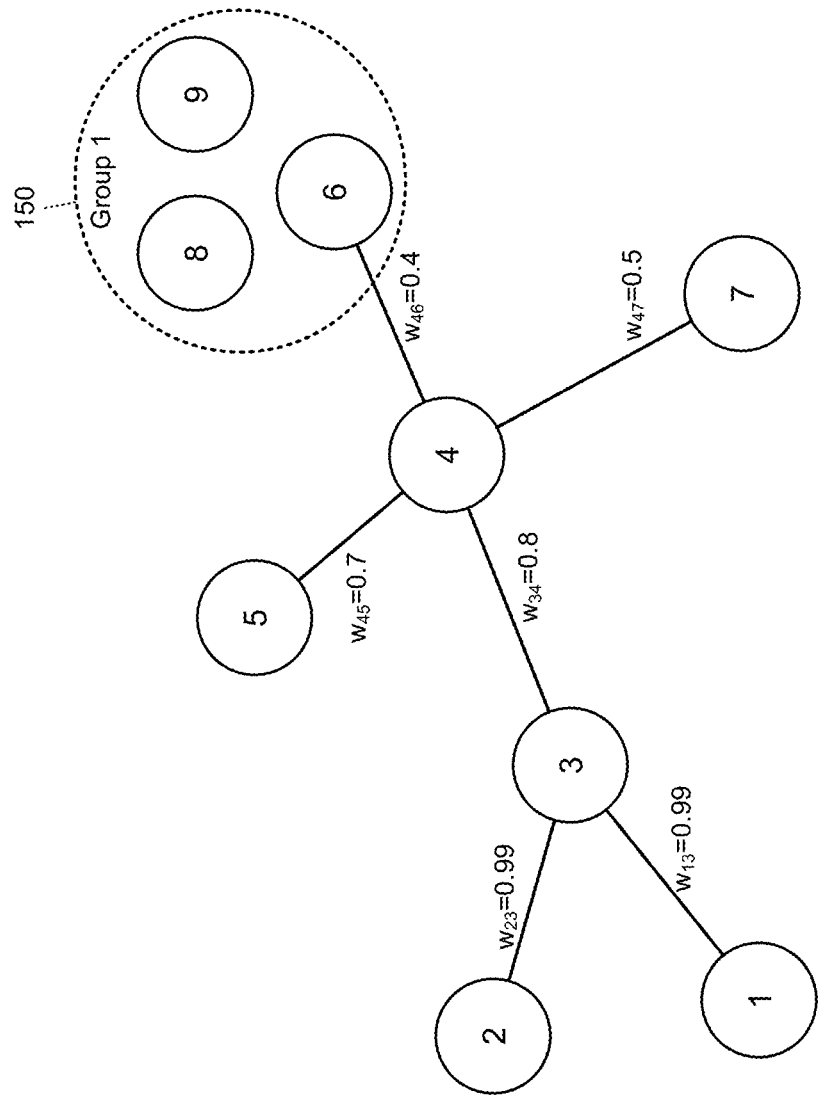
FIG. 2 is a graphical illustration of a simple relationship topology for nine metrics of a monitored system.

In FIG. 2, nine metrics are graphically presented as circles connected with edges, each having a corresponding weight. Weights are shown in FIG. 2 as examples only, such as weight of 0.99 for the edge between nodes one and three (denoted as W13 or, because edges are non-directional, W31). A first group 150 is also defined. Instead of associating metrics six, eight, and nine by individual edges, the first group 150 associates all of the included metrics (six, eight, and nine in this example) together. In various implementations, the first group 150 may be converted to edges by creating an edge between every pair of metrics within the first group 150.

Although not shown in FIG. 2, each of the metrics in the first group 150 may be associated with a value indicating the strength of the grouping for each metric. For example, each of metrics six, eight, and nine may be associated with a value between zero and one expressing a percentage significance of the first group 150 to that metric.

In FIG. 3, a screenshot of an example user interface depicts a set of detected anomalies. Each of the six anomalies includes a score in the upper-left-hand corner, which are shown as being 91, 84, 84, 83, 83, and 82. In addition, the start time of the anomaly and the duration of the anomaly are shown. For example, the upper-left anomaly began at 7:21 p.m. and lasted for ten minutes.

Each of the anomalies is shown with a plot of a selected one of the metrics associated with that anomaly. In the upper-left anomaly, there are twenty-one associated metrics and a graphical plot is shown of one of the twenty-one metrics. The remaining anomalies in FIG. 3 each correspond to a single metric.

As seen in the screenshot, the user interface allows for a variety of filters to be set, such as a lower bound on the score (termed "Significance"). In FIG. 3, the Significance is set at 70, meaning that only anomalies having a score of 70 or greater are shown. In addition, a date range is available for filtering and a sort type can be chosen. The display may be refreshed periodically or by manual instruction of the user.

Different views can be selected, which may allow for fewer or more anomalies to be shown, corresponding to more or less information present on the screen for each anomaly. The upper-left anomaly has twenty-one metrics with only one being graphically depicted. Ghosted arrows on either edge of the plot of the selected metric allow for other plots of metrics associated with this anomaly to be shown on the present screen.

Among the user interface options available in FIG. 3 are thumbs-up and thumbs-down icons below each anomaly. These icons allow a user to identify an anomaly as being a true positive (thumbs-up) or a false positive (thumbs-down). As described above, a false positive should be included in the abnormal model as an expected anomaly while true positives should remain as stand-outs from the standard less significant anomalies.

Figure 4:
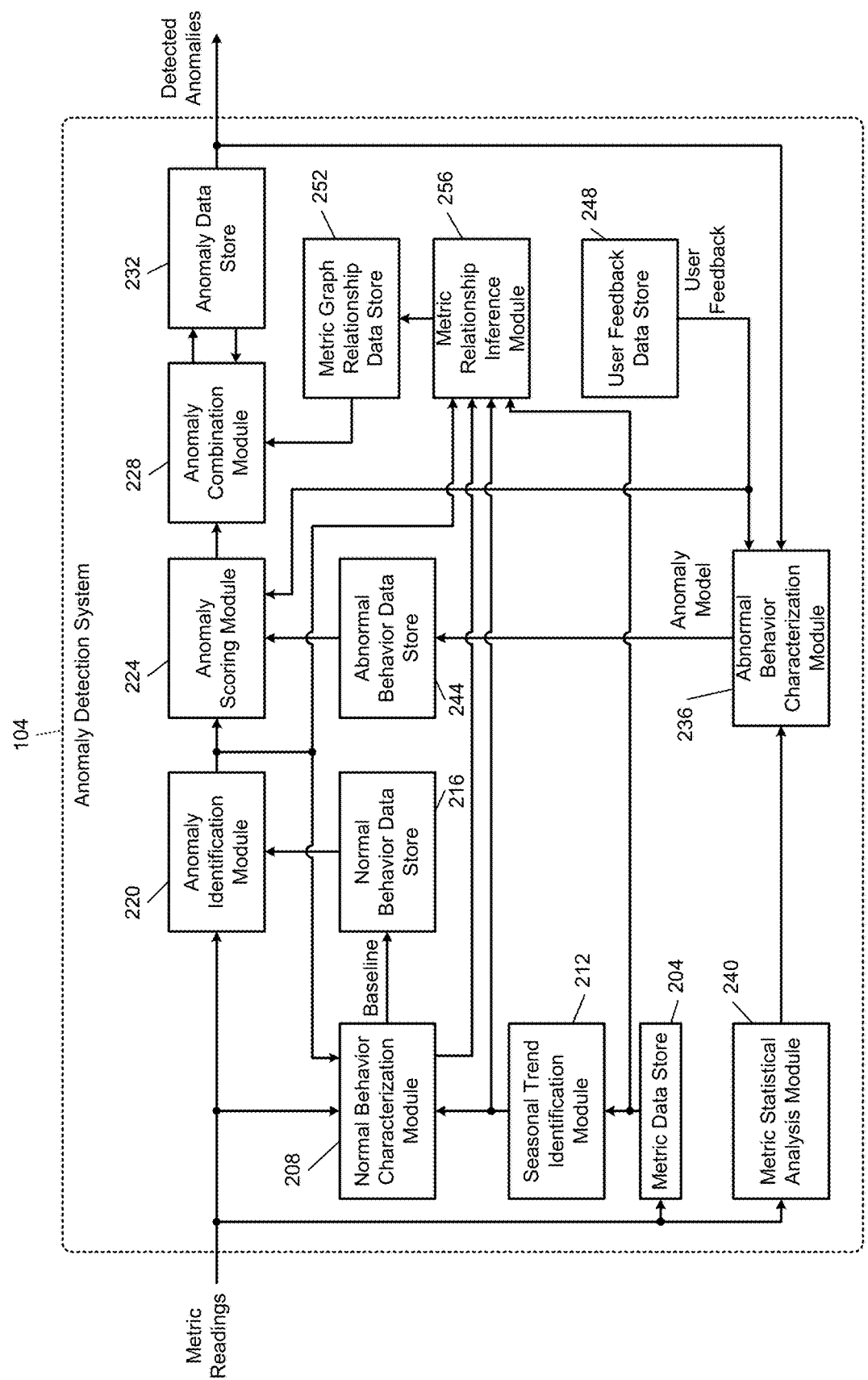
FIG. 4 is a functional block diagram block diagram of an example implementation of an anomaly detection system.

In FIG. 4, an example implementation of the anomaly detection system 104 is shown. Metric readings are received by the anomaly detection system 104 and stored in a metric data store 204. The metric readings are also processed by a normal behavioral characterization module 208.

A seasonal trend identification module 212 may analyze readings of a metric over a period of time such as days, weeks, or months, and identifies whether there are seasonal trends in the metric. Seasonal trends may, for example, identify that each seven day period contains five consecutive days where activity for the metric is higher than the remaining two days. Of course, this likely corresponds to the standard five-day work week.

The seasonal trend identification module 212 may also determine that twenty-four-hour cycles are present where the expected value of the metric may differ depending on the time of day. In various implementations, these seasonal trends may be completely algorithmic, with no preset information provided to the seasonal trend identification module 212 about the existence of seven-day weeks, twenty-four-hour days, etc.

Based on seasonal trends and the observed metric readings, the normal behavior characterization module 208 determines a baseline for the metric. This baseline is stored in a normal behavior data store 216. The normal behavior data store 216 may store a model of the baseline along with whatever seasonal adjustments to the baseline may be necessary. The baseline may be a function of time, and may define a range of expected values for each point in time.

An anomaly identification module 220 can then use the model from the normal behavior data store 216 to determine what the readings of a metric should be and identify deviations from that expected baseline. When an anomaly in a metric is identified, this detection is provided to an anomaly scoring module 224.

The anomaly scoring module 224 determines a score for the detected anomaly based on how significant the anomaly appears. As the intensity of the anomaly increases (that is, the amount of deviation of the metric away from the baseline), and as the duration of the anomaly increases, the score correspondingly increases. An anomaly combination module 228 combines the score for the single metric calculated by the anomaly scoring module 224 along with the scores of other detected anomalies. These scores and other characteristics of other anomalies are stored in an anomaly data store 232.

The anomaly data store 232 provides details of anomalies for other metrics to the anomaly combination module 228 and also stores scores and data related to combined anomalies as determined by the anomaly combination module 228. The anomaly data store 232 also provides information about the detected anomalies to, for example, the reporting system 112 of FIG. 1.

The detected anomalies are analyzed by an abnormal behavior characterization module 236 to determine a model of anomalies experienced by each metric. A metric statistical analysis module 240 may determine statistics for each metric, such as absolute minimum value, absolute maximum value, mean, median, standard deviation, etc. The absolute minimum and maximum values determine a range within which the metric operates. For example, the values of a CPU utilization metric will generally range between 0% and 100%.

The metric statistical analysis module 240 allows the anomaly detection system 104 to determine these ranges without explicit input from operators of the monitored servers 100. Using statistical analysis, the metric statistical analysis module 240 can determine that, for example, a metric of CPU utilization varies between 0 and a number close to 100 while a query response time varies between 40 and 3000 (which may represent time in milliseconds).

The abnormal behavior characterization module 236 analyzes anomalies for a metric from the anomaly data store 232 and statistical values for the metric from the metric statistical analysis module 240 and generates an anomaly model for storage in an abnormal behavior data store 244.

The anomaly model may also be based on user feedback from a user feedback data store. For example, anomalies identified by the user as being less significant or not representative of actual problems may be weighted more heavily in determining the anomaly model. The anomaly scoring module 224 uses the anomaly model for the metric for the abnormal behavior data store 244 to determine how significant a given anomaly is. For example, if the intensity of the detected anomaly is greater than the typical anomaly for the metric, this is an indication of greater significance. Further, if the duration of the anomaly has already exceeded an expected value of anomaly duration, this is yet another indication of significance of the anomaly.

When combining multiple anomalies into a single combined anomaly, relationships between the metrics are specified by a metric graph relationship data store 252. When multiple anomalies are present across related metrics, this may be an indication of greater significance of the combined anomaly. A metric relationship inference module 256 infers relationships between the metrics and stores a representation of the topology of these relationships in the metric graph relationship data store.

The metric relationship inference module 256 receives information about the timing and magnitude of anomalies, such as from the anomaly identification module 220. In other implementations, information about the anomalies may be received from the abnormal behavior data store 244. Data from the abnormal behavior data store 244 may be a reduced representation (such as a model) while data from the anomaly identification module 220 may represent a full set of historical anomaly data for more precise similarity analysis. The metric relationship inference module 256 receives data of the metrics from the metric data store 204 which may be time series data of each metric. The metric relationship inference module 256 also receives information about seasonal trends of the metrics as identified by the seasonal trend identification module 212.

The metric relationship inference module 256 also receives information about the metric type from the normal behavior characterization module 208. For example, the metric relationship inference module 256 may rely on determinations made by the normal behavior characterization module 208 about whether a metric is continuously valued or represents an alternative type of metric such as enumerated value, binary, sparse, etc.

Figure 5:
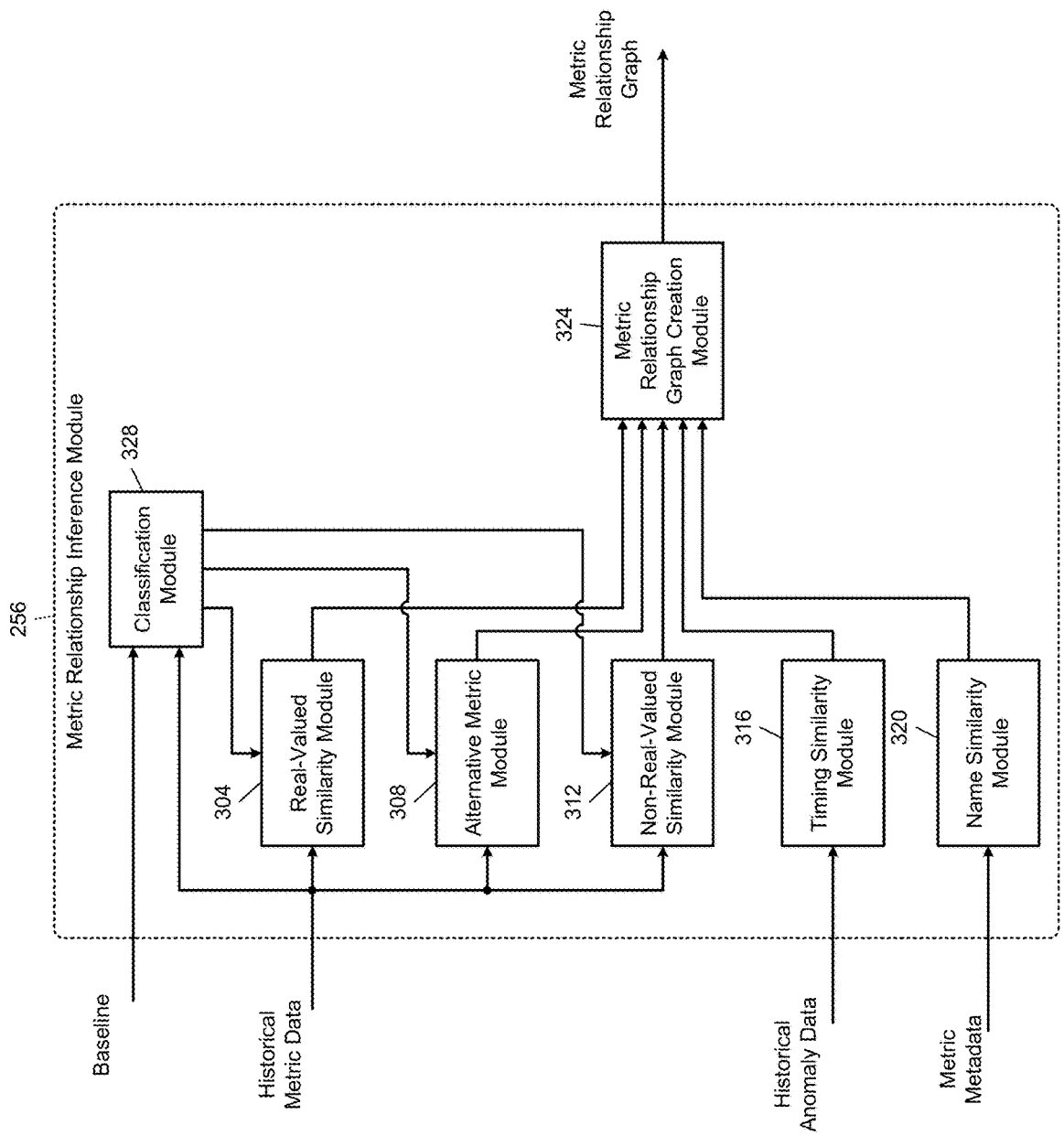
FIG. 5 is a functional block diagram of an example implementation of a metric relationship inference module.

In FIG. 5, an example implementation of the metric relationship inference module 256 includes a real-valued similarity module 304, an alternative metric module 308, a non-real-valued similarity module 312, a timing similarity module 316, and a name similarity module 320. Each of these modules provides similarity data to a metric relationship graph creation module 324, which generates a metric relationship graph for storage into the metric graph relationship data store 252 of FIG. 4.

The similarity data may all be stored individually and/or may be combined. For example, a single overall weight for each edge may be calculated from one or more individual weights. In addition, heuristics may remove edges determined to be insignificant, such as an edge of a row weight that is not corroborated by similarity data from another module. A classification module, 328 receives baseline date, such as from the normal behavior characterization module 208 of FIG. 4, and determines whether a metric is real-valued, non-real-valued, or is an alternative metric such as a sparse metric. The classification module 328 then instructs the appropriate one of the real-valued similarity module 304, the alternative metric module 308, and the non-real-valued similarity module 312 to analyze historical metric data for the metric.

The timing similarity module 316 reviews historical anomaly data and determines similarities between metrics based on the times at which those metrics had values indicative of anomalies. The name similarity module 320 identifies similarities between metrics based on the names of the metrics.

Figure 6:
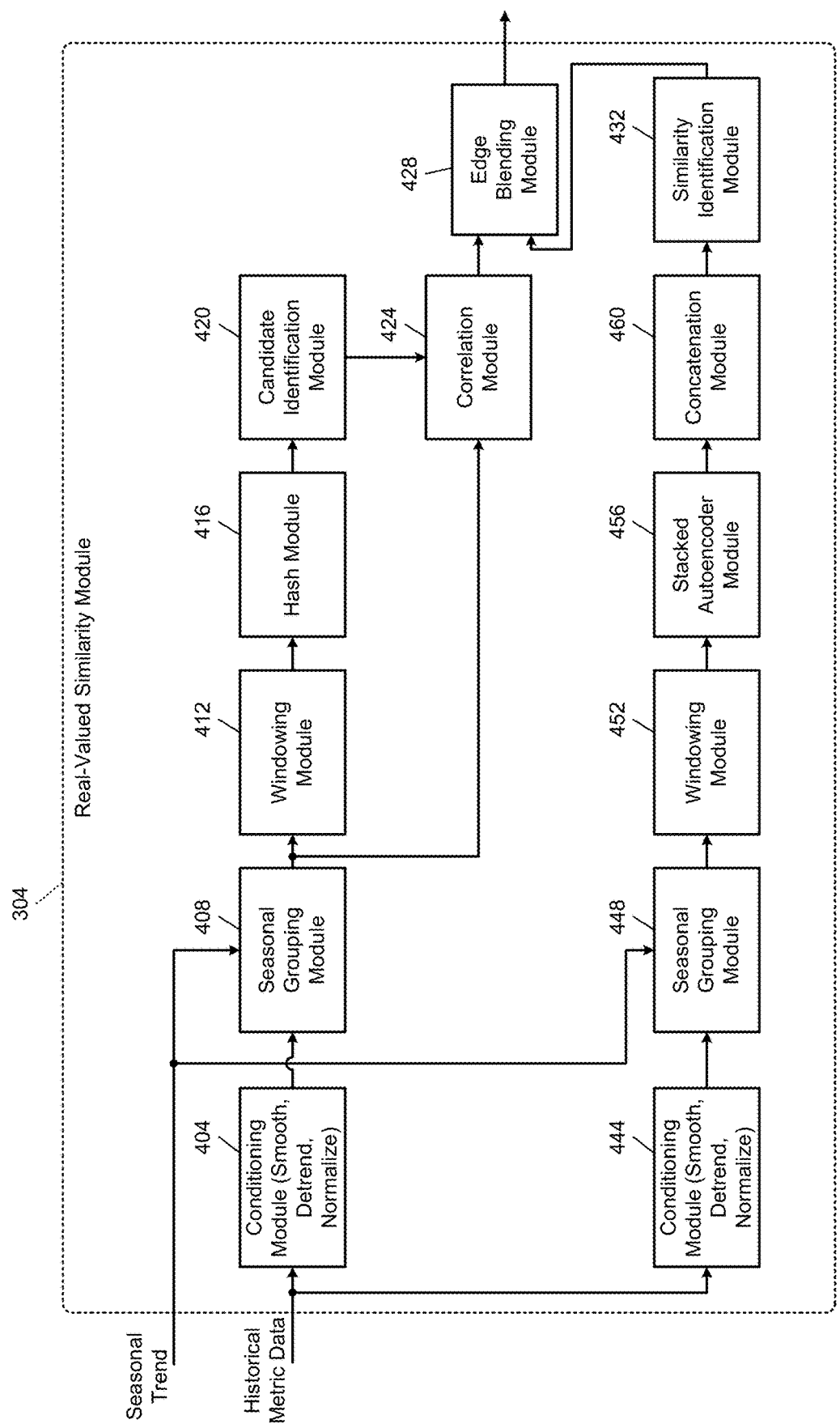
FIG. 6 is a functional block diagram of an example implementation of a real-valued similarity module.

In FIG. 6, an example implementation of the real-valued similarity module 304 includes a conditioning module 404 that receives and conditions historical metric data. The conditioning module 404 may perform one or more of smoothing (such as applying a low pass filter or moving average), de-trending (removing low frequency drift), and normalizing (scaling to a pre-determined range or to a range based on statistical analysis of the metric).

A seasonal grouping module 408 groups metrics according to seasonal trend data, such as from the seasonal trend identification module 212 of FIG. 4. For example, metrics that have a weekly seasonal trend may be grouped together. In various implementations, metrics that have a weekly seasonal trend may only be compared against other metrics having a weekly seasonal trend. In other implementations, the seasonality may simply be used as a factor in determining how similar two metrics are to each other.

A windowing module 412 splits each metric into windows of time. These windows may all be of equal length and will be time-aligned. For example, a twenty-four-hour period may be used as the window length and each twenty-four-hour window of each metric will be aligned so that the twenty-four-hour windows are not staggered.

A hash module 416 calculates a hash for each window of each metric. Each window of each metric is thereby assigned to a group according to the hash value calculated by the hash module 416. The grouping may be relatively coarse, grouping windows of metrics having some similarity but not necessarily near identity. A candidate identification module 420 identifies candidate pairs of metrics based on hash values. When the hash values of two time-aligned windows of a metric are equal, this indicates some level of similarity for that time window between the two metrics. If more than a predetermined percentage of the windows of a pair of metrics have equal hash values, that pair of metrics is determined to be a candidate.

Candidate pairs are passed to a correlation module 424, which determines a mathematical distance between the two metrics. This mathematical distance may be an exact calculation, which in some implementations is too computationally intensive to apply to every possible pair of metrics. Therefore, the correlation module 424 determines distances between only the pairs of metrics identified as candidates by the candidate identification module 420.

In some implementations, the windows may only be used to determine the candidate pairs and the correlation module 424 evaluates the entire length of each of the metrics. When readings from the metrics in a candidate pair are not coextensive in time, only the period of overlap is evaluated by the correlation module 424.

The correlation module 424 may use any statistical or mathematical representation of similarity such as cosine distance, hamming distance, Euclidean distance, correlation coefficient, etc. When the calculated similarity is above a predetermined threshold, an edge is defined between the pair of metrics and the weight of the edge is based on the calculated similarity. This edge is passed to an edge blending module 428.

The edge blending module 428 combines the edge from the correlation module 242 with an edge from a similarity identification module 432. The similarity identification module 432 provides edge data using a stacked autoencoder approach as opposed to a hash approach. A conditioning module 444 receives historical metric data and conditions that data. A seasonal grouping module 448 groups metrics according to their apparent seasonality. A windowing module 452 divides each metric into time aligned window periods. In various implementations, the conditioning module 444, the seasonal grouping module 448, and the windowing module 452 may operate similarly to, or may combined with, the conditional module 404, the seasonal grouping module 408, and the windowing module 412, respectively.

A stacked autoencoder module 456 trains a stacked autoencoder for each window of each metric and outputs the training coefficients to a concatenation module 460. The concatenation module 460 combines the reduced representation (coefficients) from each window of a metric and outputs the concatenated reduced representation to the similarity identification module 432. The similarity identification module 432 determines the similarity between each pair of metrics based on the reduced representation of each metric from the concatenation module 460.

Because the metrics have been processed into such a reduced space, it may be computationally practical to preliminarily evaluate the similarity between every pair of metrics. The edge blending module 428 may combine edges identified by the correlation module 424 and the similarity identification module 432 into a single edge score such as by calculating a weighted average.

Figure 7:
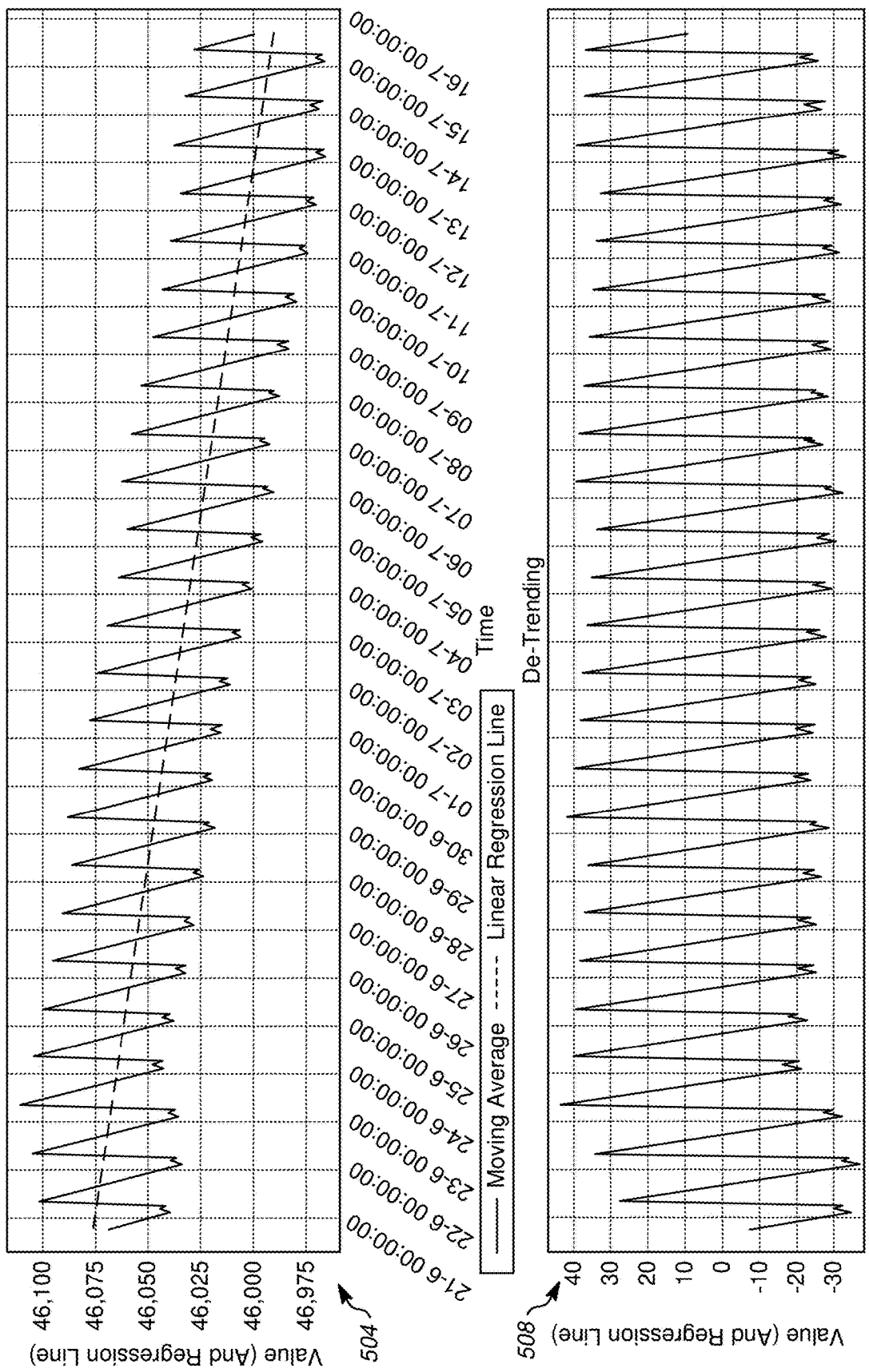
FIG. 7 is a graphical example of a de-trending operation performed on time-series data.

In FIG. 7, example time-series data 504 of a first metric can be seen to have a decreasing trend. At 508 a de-trended transformation of the time series data is shown. A high-pass filter may be used to remove the low-frequency trend. In other implementations, a moving average of the time-series data may be created and then a best fit line is determined from the moving average. This best fit line serves as the trend line, which is subtracted from the time-series data to create the de-trended data 508. When a metric is seasonal, the de-trending may be performed individually for each season.

Figure 8:
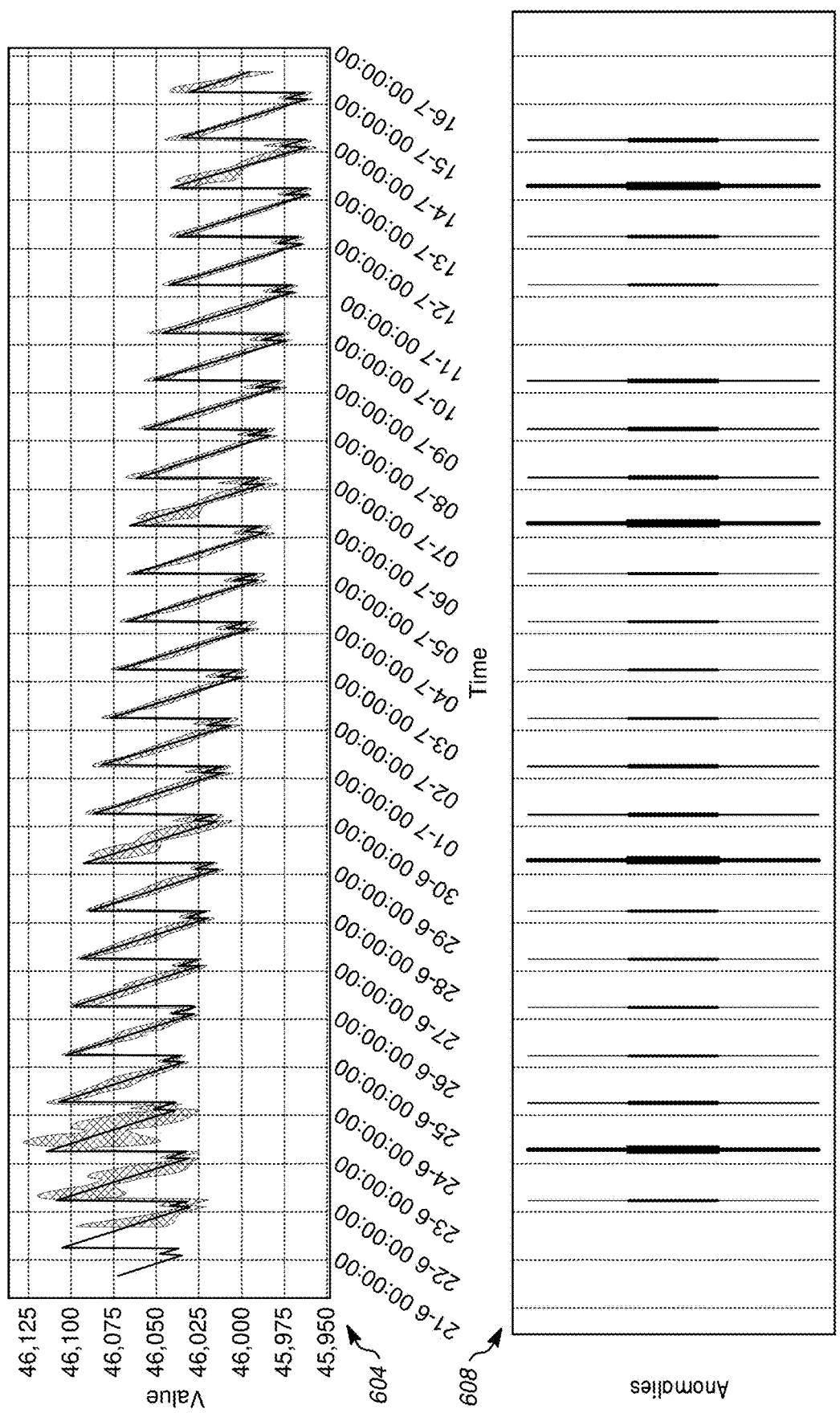
FIG. 8 is a graphical example of anomaly timing analysis of time-series data.

In FIG. 8, an example time series 604 of a metric is shown where abnormalities of the metric are indicated with shading. An anomaly transformation 608 is shown where only the timing (and in some implementations, magnitude) of detected anomalies of the metric are present.

Figure 9:
FIG. 9 is a graphical example of metric clustering according to metric name similarity.

In FIG. 9, a graphical example of name-based similarity 700 is shown. Metrics having similar names are shown grouped together while similarities between only portions of metric names are represented as lines connecting clusters of metrics.

Figure 10:
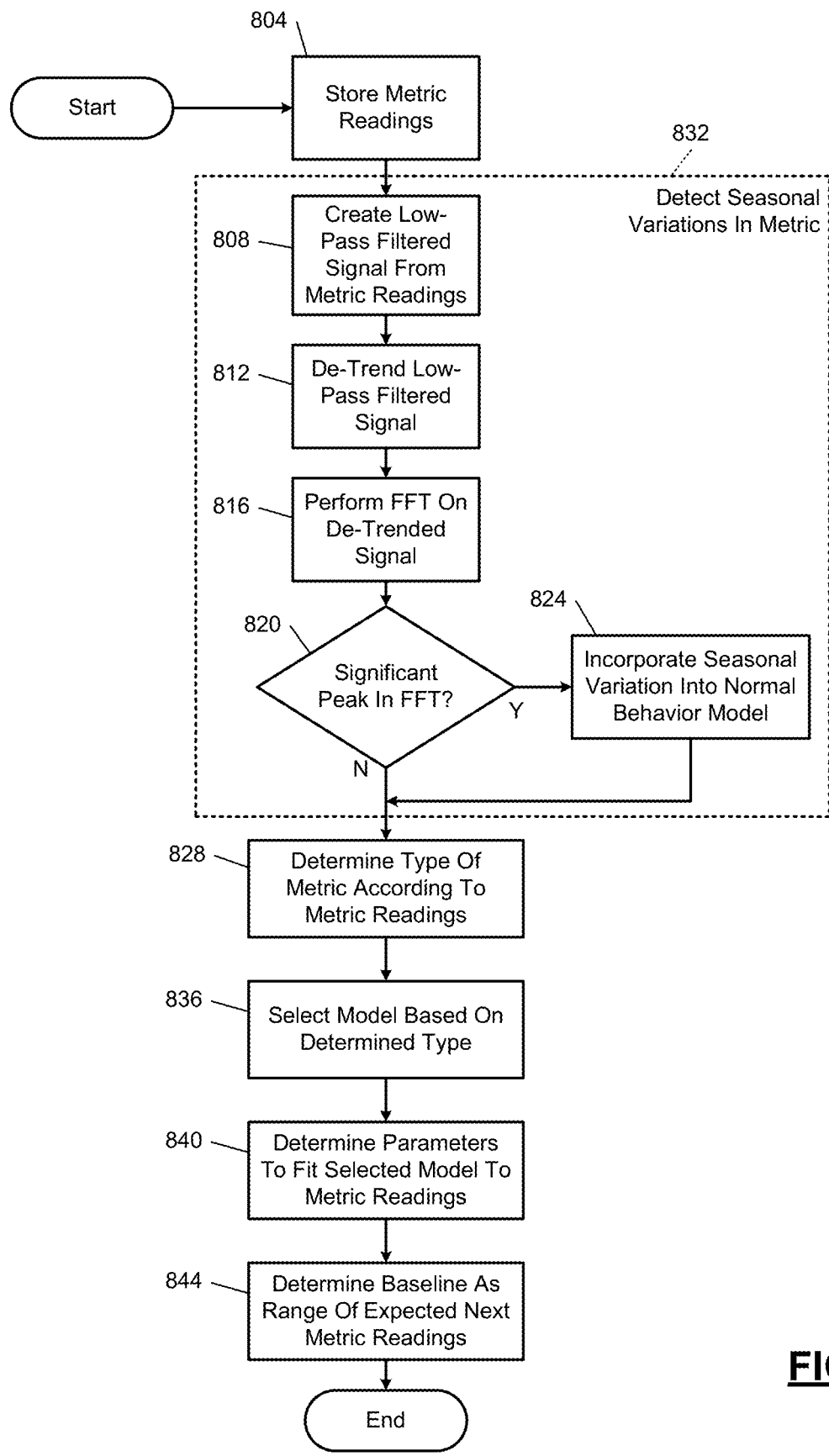
FIG. 10 is a flowchart of example characterization of normal behavior for a metric.

FIG. 10 depicts how normal behavior is characterized. Control starts at 804 where metric readings are stored. Control then continues at 808 where a low-pass-filtered signal is determined from the metric readings. At 812 control de-trends the low-pass-filtered signal. For example, de-trending may determine a best fit line for the low-pass-filtered signal (using, for example, minimum mean squared error) and then adjust the low-pass-filtered signal so that the line is parallel to the x-axis.

At 816 control performs a fast Fourier transform (FFT) on the de-trended signal. The FFT may be limited to avoid aliasing and in some implementations may be limited to periods of 168 hours or less. This corresponds to a week, meaning that only seasonal patterns of up to a week will be detected—for example, a frequency value having more than a predetermined multiple greater energy than the next highest frequency value.

Control determines whether there is a significant peak in the FFT. If so, control transfers to 824. Otherwise, control continues at 828. At 824 the significant peak is presumed to correspond to seasonal behavior and control incorporates the seasonal variation into the normal behavior model. For example, the seasonal variation may be removed when determining the type of metric at 828 and then re-added to the final, normal behavior model. Control then continues at 828. The seasonal variation of 808, 812, 816, 820, and 824 is shown together with reference numeral 832 and is optional, meaning that it can be removed in some implementations.

At 828 control determines the type of metric according to the stored metric readings. At 836 control selects a model based on the determined type of the metric. At 840 parameters are determined to fit the selected model to the metric readings. At 844 control determines a baseline for the metric when the metric defines the range of expected readings as a function of time for the metric. Control then ends.

Figure 11:
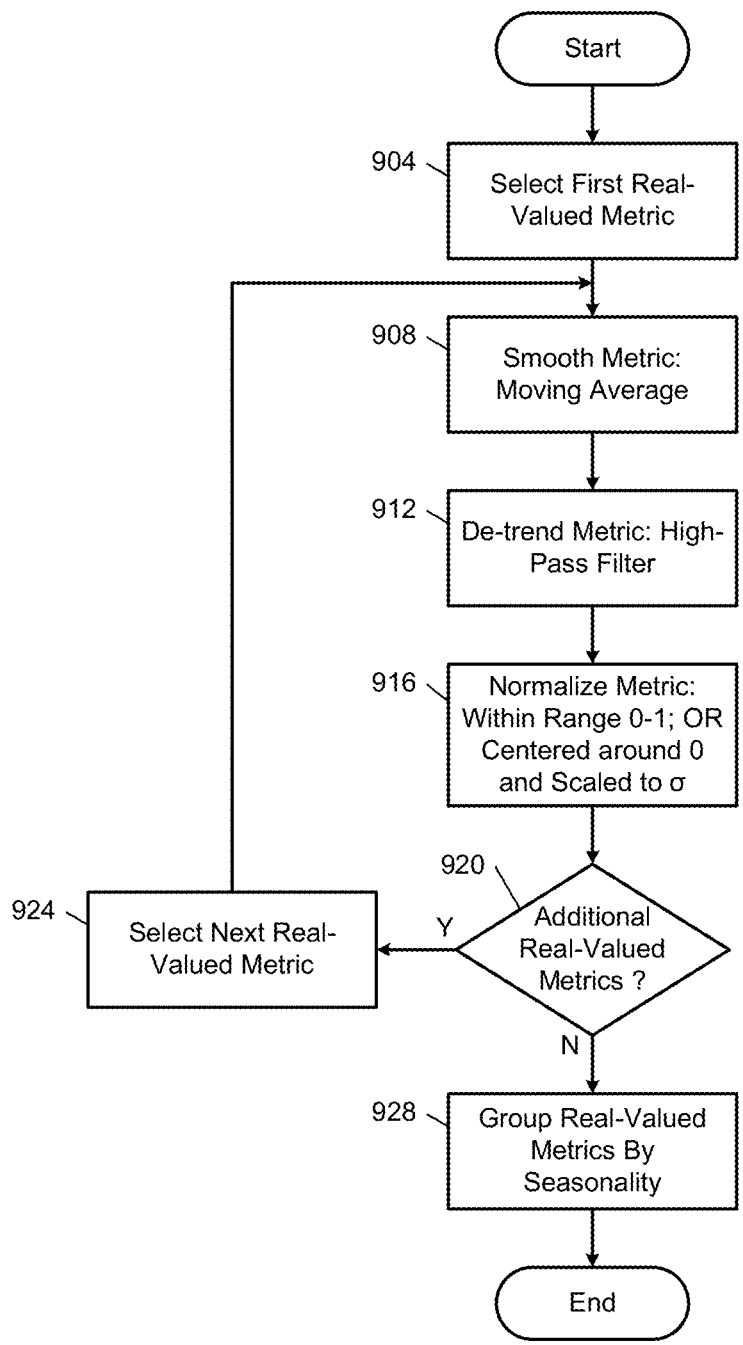
FIG. 11 is a flowchart of example conditioning performed on real-valued metrics.

In FIG. 11, an example conditioning procedure begins at 904 where a first one of the real-valued metrics is selected. Control continues at 908 where the metric is smoothed, such as by using a moving average. At 912 control de-trends the metric. For example, control may apply a high-pass filter to the metric or may apply a piecewise linear offset to the metric. For example, each piece of the piecewise linear offset may correspond to a separate season of the metric.

At 916 control normalizes the metric. For example, control may normalize the metric to a predetermined range of values, such as from zero to one. In other implementations, control may center the values of the metric about zero (in other words, shift the values of the metric so that the mean value is zero) and then scale the metric by the standard deviation of the metric over time so that the standard deviation of the resulting normalized metric is equal to one.

At 920 control determines whether there are any additional real-valued metrics. If so, control transfers to 924; otherwise, control transfers to 928. At 924 control selects the next real-valued metric and returns to 908. At 928 control groups the real-valued metrics by their seasonality, which may have been determined according to FIG. 10. Control then ends.

Figure 12:
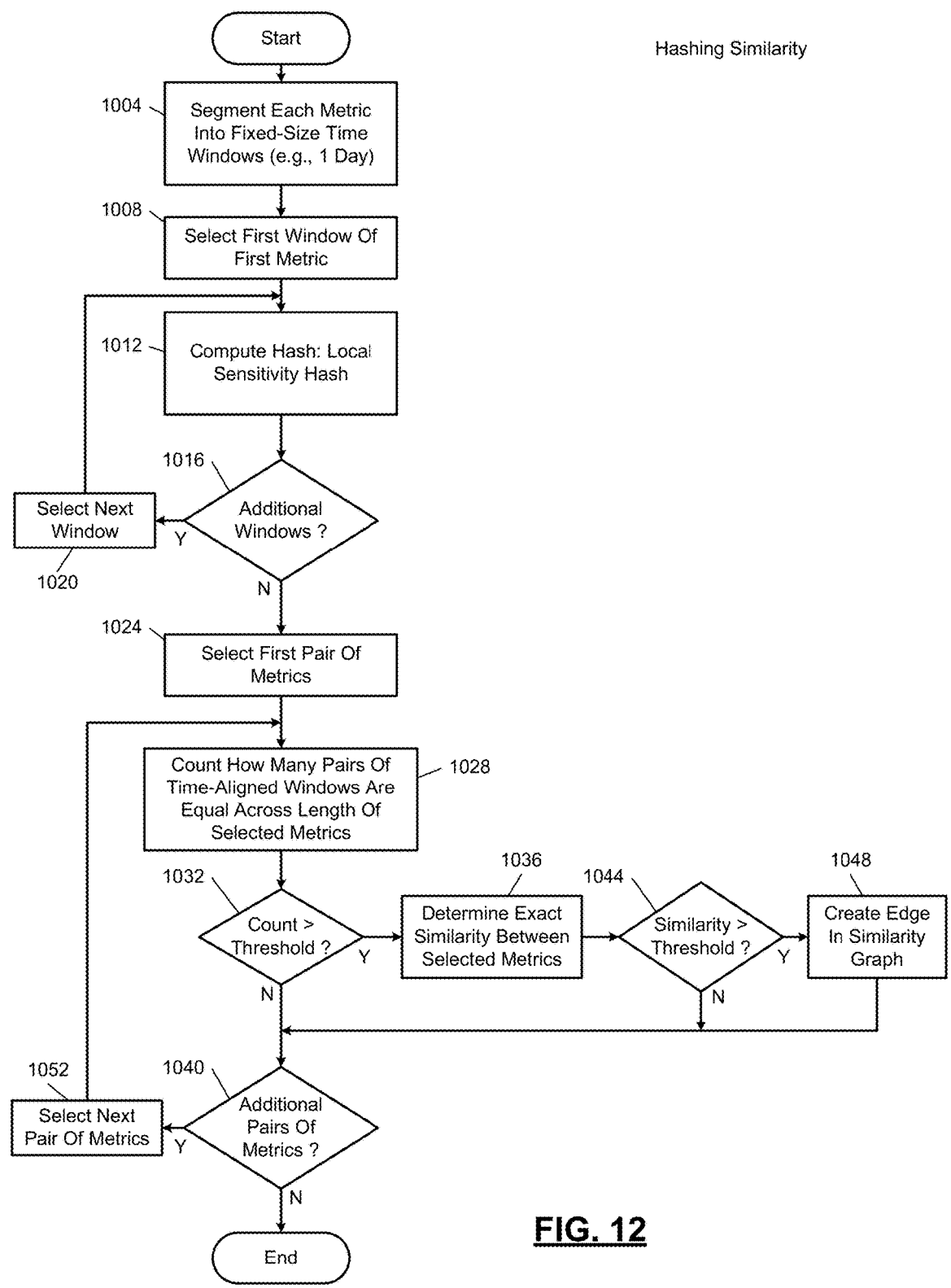
FIG. 12 is a flowchart of example metric similarity analysis using hashes.

In FIG. 12, example hashing similarity analysis begins at 1004 where each metric is segmented into fixed-size time windows. For example, the length of time may be one day. The windows for each metric are aligned in time so that the corresponding windows of each metric all begin at the same moment. At 1008 control selects the first window of the first real-valued metric.

At 1012 control computes a hash of the values of the selected metric within the selected window. For example, the hash may be calculated as a local sensitivity hash. At 1016, if there are additional windows for which hashes have not been calculated, control transfers to 1020; otherwise, control transfers to 1024. At 1024 control selects a first pair of the real-valued metrics.

At 1028 control counts how many pairs of the time aligned window hashes are equal across the lengths of the selected metrics. At 1032 control compares the count to a threshold. If the count exceeds the threshold control transfers to 1036; otherwise, control transfers to 1040. The threshold may be an absolute number or may be based on a percentage of the length of the metrics. For example, when the selected metrics are not coextensive, only the windows that overlap in time can be compared across the metrics. The threshold may therefore be based on a percentage of the number of time aligned windows shared by both metrics.

At 1036 control has identified the currently selected pair of metrics as a candidate pair. Control therefore invests computational resources in determining the exact similarity between the selected metrics. The exact similarity may include cosine distance, correlation coefficient, Hamming distance, Euclidean distance, etc. At 1044 control determines whether the similarity is greater than the threshold. If so, control transfers to 1038; otherwise, control continues at 1040. At 1048 control creates an edge in the similarity graph where a weight of the edge may be based on the determined similarity. Control then continues at 1040. At 1040 control determines when there are additional pairs of metrics to evaluate. If so, control transfers to 1052; otherwise, control ends. At 1052 control selects the next pair of metrics and returns to 1028.

Figure 13:
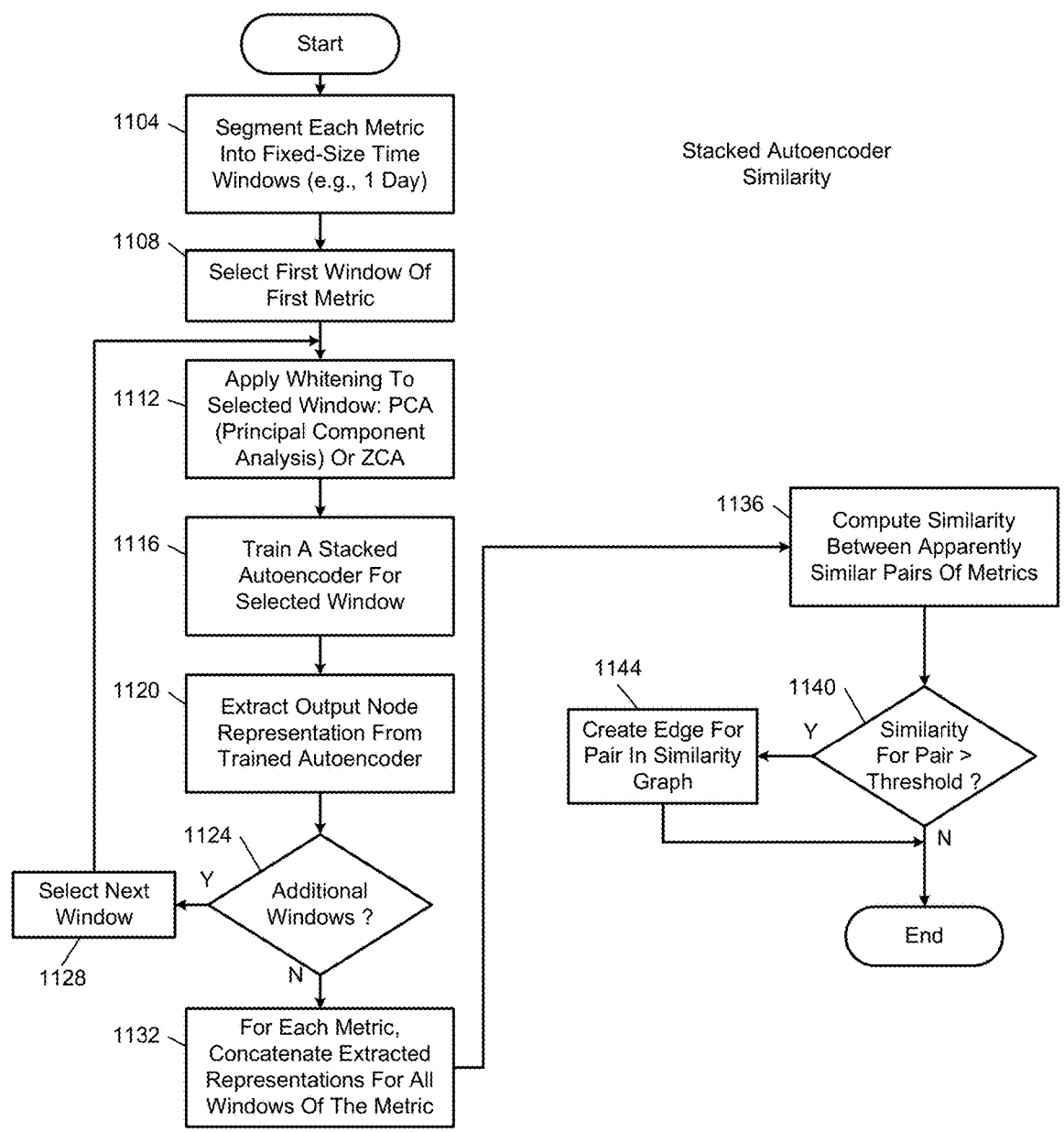
FIG. 13 is a flowchart of example identification of metric similarity analysis using a stacked autoencoder.

In FIG. 13, an example operation of stacked autoencoder similarity analysis begins at 1104 where each metric is segmented into fixed-size time windows such as one day in length. At 1108 control selects the first window of the first metric. At 1112 control applies whitening to the selected window of the selected metric. The whitening transforms the input data space into a new space such that the data is linearly independent between the dimensions.

For example, given a set of data vectors in $R^n$, PCA (Principal Component Analysis) and ZCA find a linear projection of the data into $R^m$ such that the covariance matrix of the data in $R^m$ is diagonal. This means that there is no correlation between the data samples in each dimension (from 1 to N). In geometrical terms, PCA/ZCA rotates the axes such that there is no linear correlation between the data samples across the different axes. Each vector includes the samples of all metrics at a given time. For example, if the window is one day long and the metric is sampled every five minutes, there will be 288 samples (12 samples per hour), which provides 288 dimensions to whiten. Whitening includes computing the covariance metrics using all metric windows (the covariance metric will be 288×288), finding the eigenvectors (or, eigenvalues), and multiplying the original data by the eigenvector matrix to rotate the original data so that the new covariance matrix is diagonal.

Control continues at 1116 where a stacked autoencoder is trained for the selected window. Stacked autoencoders are further described in the Stacked Autoencoders page, dated Apr. 7, 2013, from the unsupervised feature learning and deep learning (UFLDL) project at Stanford University, available at http://ufldl.stanford.edu/wiki/index/php/Stacked_Autoencoders, and retrieved Jan. 18, 2015, the entire disclosure of which is hereby incorporated by reference.

The input to the stacked autoencoder includes the number of layers and the number of nodes per layer. The number of nodes in the output layer may be much smaller than the input. Each layer has a decreasing number of nodes compared to the previous inputs. A greedy approach can be used based to determine the number of nodes which minimize the representation error, penalized by the number of nodes (to avoid having too many layers and nodes). In various implementations, each layer has half the number of nodes of the previous layer. So, if the input has 288, the next layer 144, and then 77, and so on. The number of layers can be heuristically chosen based on empirical data produced by experimenting with the number of layers.

The stacked autoencoder is trained using all of the windows and the training criterion tries to minimize the representation error between the input and the output of the original data samples. At 1120 the window of the metric is replaced by the index of the nodes that were activated during the training for that window. For example, each window of the metric may be reduced to a list of the output nodes of the stacked autoencoder. At 1124 control determines whether there are additional windows to process. If so, control transfers to 1128; otherwise, control transfers to 1132. At 1128 control selects the next window and returns to 1112.

At 1132 control, for each metric, concatenates the extracted representations for all windows of the metric. Each metric therefore has a concatenated set of reduced representations of each constituent window. At 1136 control computes the similarity between apparently similar pairs of metrics. In other words, to reduce computation burden, control reduces the entire universe of pairs of metrics to a limited set referred to as candidate pairs and only finally computes similarity scores for the candidate pairs. Pairs that fall below a preset similarity score threshold are not fully computed.

For example only, an algorithm may be used as described in "Scaling Up All Pairs Similarity Search", Bayardo, R., Ma, Y., Srikant, R., May 2007, Worldwide Web Conference 2007, pp. 131-140, the entire disclosure of which is hereby incorporated by reference. At 1140 control reviews the similarity scores calculated for the candidate pairs of metrics. If the similarity score for a pair of metrics is greater than the threshold, control transfers to 1144; otherwise, control ends. At 1144, edges are created in the similarity graph for each edge whose similarity score exceeds the threshold. Control then ends.

The similarity between two metrics is determined by comparing, for each window, the amount of overlap in terms of activation nodes, and averaging the overlap over all windows. For example only, consider a simple case of two metrics, each of which having two windows, where both windows are time-aligned between the two metrics. As an example, metric 1 may have a concatenated extracted representation of window 1 (output node 1 and output node 2) and window 2 (output node 10 and output node 15). Metric 2 may have a concatenated extracted representation of window one (output node 1) and window 2 (output node 10 and output node 30).

The similarity over window 1 may be calculated using, for example, cosine similarity, as 1 divided by the square root of 2, which is approximately equal to 0.7. The numerator is equal to the number of output nodes in common for metric 1 and metric 2 during window 1. The denominator is the square root of the product of (i) the number of output nodes for metric 1 of the selected window and (ii) the number of output nodes for metric 2 during the same window.

Using the same cosine distance calculation on window 2, the distance is calculated as 1 over the square root of 2×2, which equals 0.25. The overall similarity between the two metrics is determined by averaging the individual window similarities. The average of 0.7 and 0.25 is 0.475.

The similarity for each individual window may be calculated using other approaches than cosine similarity. For example, each window of the metric may include only a single output node, which is the output node most activated during training. The similarity for each window would then be binary. Either the output nodes for that window are the same between the metrics (a similarity of one) or they would be different (a similarity of zero).

Calculating the overall similarity may also use other techniques. For example, instead of averaging the similarity of each window, the number of windows for which the similarity exceeds a threshold could be counted. That count determines the weight of the edge connecting a pair of metrics, and when the count is lower than a predetermined value of percentage, the edge is either not defined or is given a weight of zero.

Figure 14:
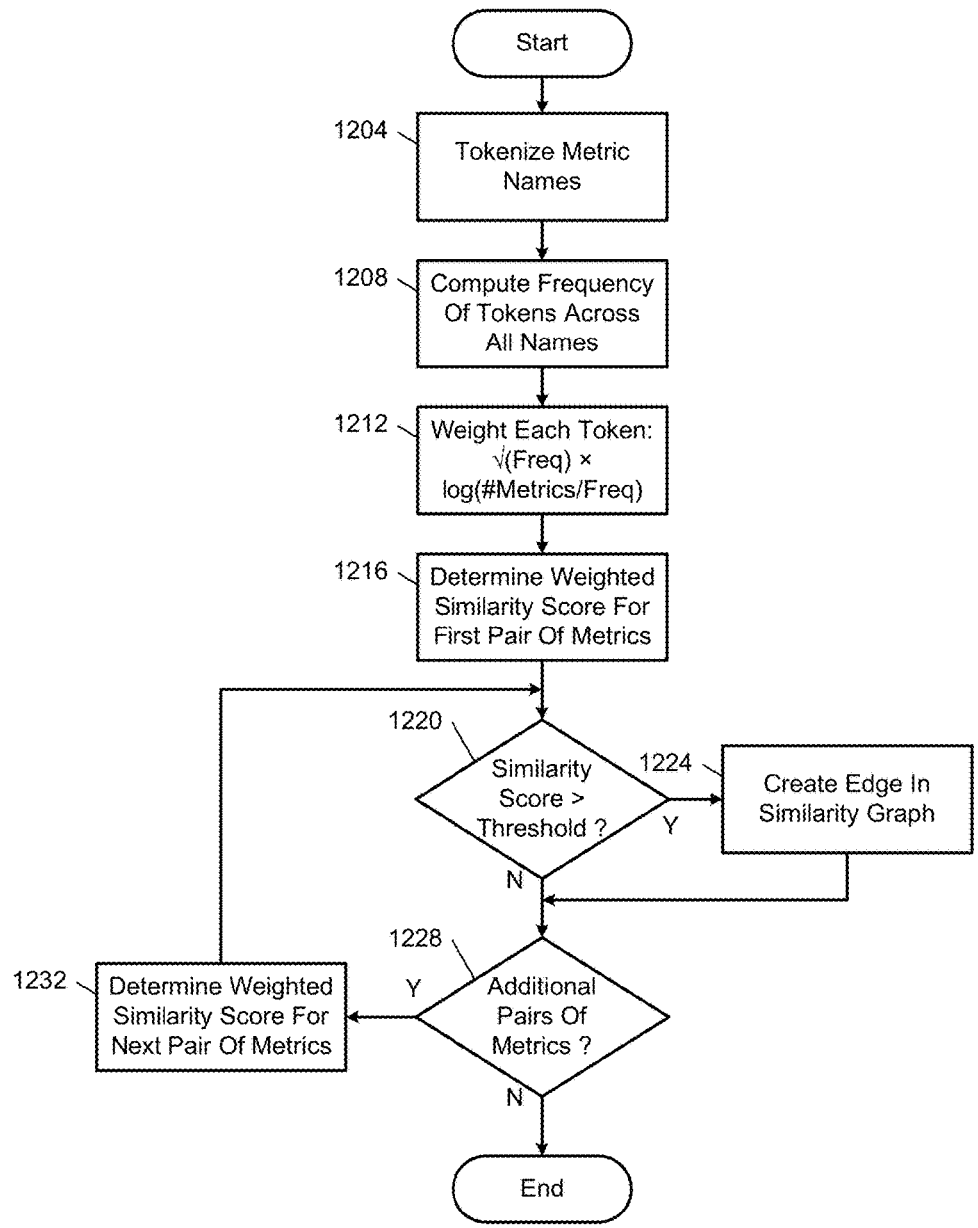
FIG. 14 is a flowchart of example metric similarity analysis based on metric names.

In FIG. 14, example control for determining name-based similarity begins at 1204 where metric names are tokenized. The metric names may be tokenized based on predetermined separators such as punctuation (specific punctuation such as commas, periods, and underscores may be specified) and case changes. In various implementations, separator characters are inferred dynamically from their occurrence in metric names. According to different naming conventions, certain punctuation characters may serve as separators in some circumstances, while in other circumstances those same characters may be in the middle of tokens that should not be split. In addition, metric names may be tokenized with reference to a dictionary or by using more advanced natural language processing.

At 1208 control computes the frequency of each token across all of the metric names. At 1212 control weights each token. Each token receives a weight that may be based on how often the token occurs in proportion to the total number of metric names or the total number of tokens across all metric names. For example, the weight for a token may be calculated by taking the square root of the number of occurrences of the token and multiplying it by the logarithm of the ratio of the number of metrics to the count of the token's occurrence. See the following equation, where "Freq" means frequency, which may simply be a count of the number of times a token is found across all the metric names:

$$\sqrt{Freq} \times \log \frac{\#Metrics}{Freq}$$

At 1216 control calculates a weighted similarity score for a first pair of metrics. The weighted similarity score may be based on the weights of the respective tokens of the pair of metrics. For example, the similarity score may be computed as the sum of the squared weights of tokens present in both metrics divided by the square root of the product of the sum of the squared values of token weights of metric 1 and the sum of the squared values of token weights of metric 2.

As a simple example of the above, consider a first metric having the name A.B.C.D.E. and a second metric having the name A.B.C.F.G. Tokenizing these metrics may use the period character as a separator. In the present example, the name of metric A is tokenized into five tokens: A, B, C, D, and E. The second metric is also tokenized into five tokens: A, B, C, F, and G. When the weight of each token is calculated, the number of times the token occurs across all metric names is determined. For example only, assume that token A appears 999 times and that there are 1,000 total metrics. The weight of A (denoted wa) would then be the square root of 999 times the logarithm of 1,000 divided by 999, which is approximately equal to 0.03.

Now each metric is represented as a set or ordered pairs where the ordered pair includes the name of the token and the weight of the token. For actual storage, the token weights may not be stored multiple times, once for each metric name where the token appears. Instead the token weights may be stored in a single lookup table.

The similarity score may then be calculated as follows: the shared tokens are A, B, and C and therefore the squared weights of these tokens are summed. The squared weights of all of the tokens of metric 1 are also summed and the squared weights of all of the tokens of metric 2 are summed. The similarity score may be equal to the shared token sum divided by the square root of the product of the metric 1 sum and the metric 2 sum. In equation form, this example similarity score is as follows:

$$\text{Similarity Score} = \frac{(wa^2 + wb^2 + wc^2)}{\sqrt{((wa^2 + wb^2 + wc^2 + wd^2 + we^2) * (wa^2 + wb^2 + wc^2 + wf^2 + wg^2)}}$$

At 1220 control determines whether the similarity score exceeds the threshold. If so, control transfers to 1224; otherwise, control transfers to 1228. At 1224, control creates an edge in the similarity graph corresponding to the pair of metrics and continues at 1228. At 1228 control determines whether there are additional pairs of metrics. If so, control transfers to 1232; otherwise, control ends. At 1232 control determines a weighted similarity score for the next pair of metrics and returns to 1220.

Figure 15:
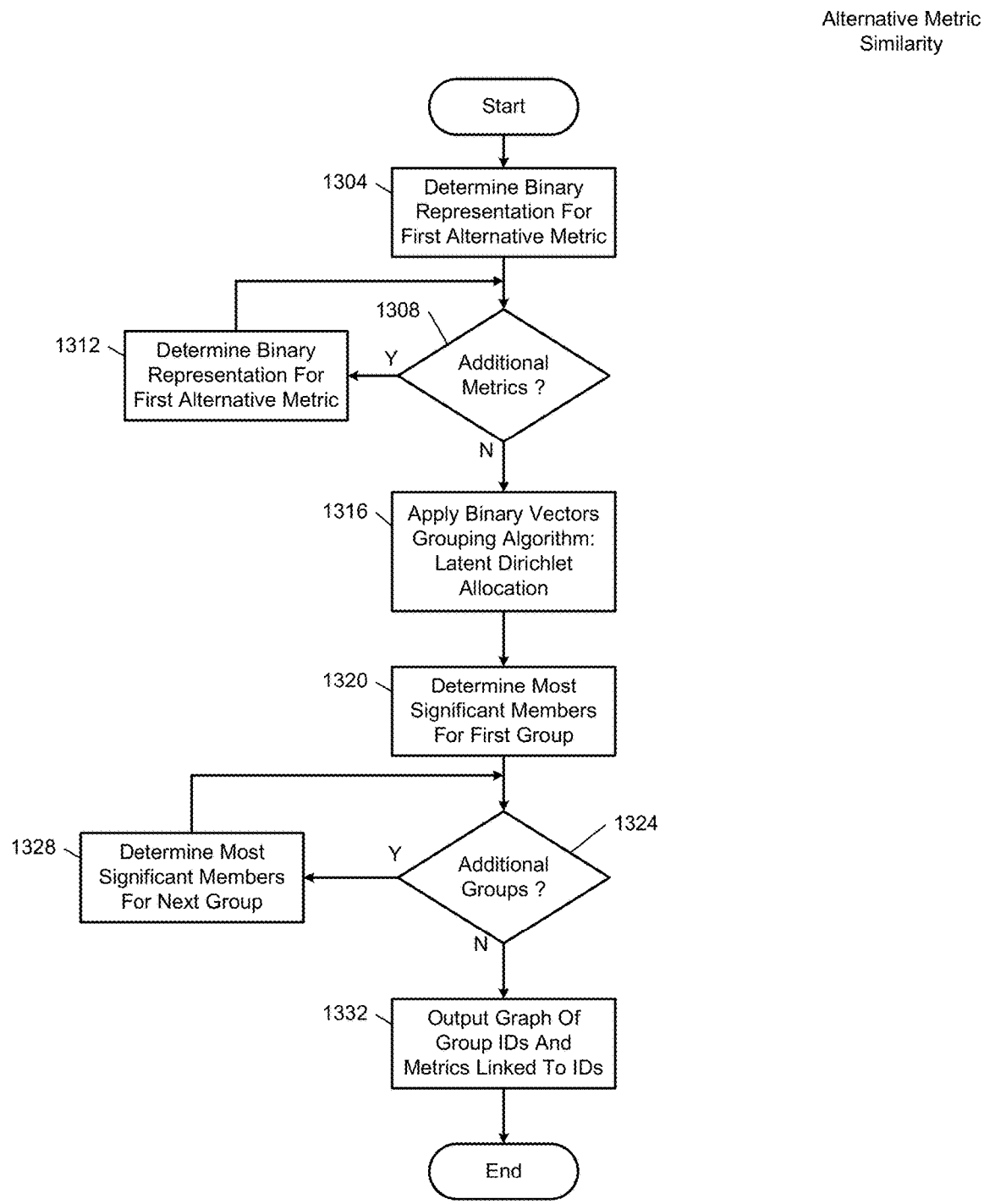
FIG. 15 is a flowchart of example metric similarity analysis for non-real-valued metrics.

In FIG. 15 the similarity analysis for alternative metrics begins at 1304 where control determines a binary representation for a first alternative metric. For example, times at which the value of the alternative metric changes may be encoded. In other words, the time series data for the first alternative metric is converted to a set of time values where each time value indicates the amount of time between successive changes to the value of the first alternative metric. In this implementation, magnitude information such as the amount of change in the value of the first alternative metric is discarded.

Alternatively, the binary representation may remain a time series and include a one for any time interval where the metric changed and a zero where the metric did not change. This binary assignment may be performed for each sample of the metric, creating a 0 or a 1 for each received sample. Alternatively, the binary assignment may be performed on a periodic timeframe, not necessarily aligned to the samples of the metric, with a 1 indicating that the metric changed during that period and a 0 indicating that the metric did not change.

In other implementations, the binary representation may have a one for any time interval during which the metric was experiencing an apparent anomaly and a zero otherwise. Again, the binary assignment may be performed for each sample of the metric or for each interval of a predefined period.

At 1308 control determines whether there are additional alternative metrics to evaluate. If so control transfers to 1312; otherwise, control continues at 1316. At 1312 control determines a binary representation for the next alternative metric and returns to 1308. At 1316 control applies a binary vectors grouping algorithm.

For example, the algorithm may include latent Dirichlet allocation (LDA). LDA receives a number of groups N and an aligned binary representation of each metric. The grouping algorithm, such as LDA, is used to group the metrics into a set of N groups. For example, the number of groups used may be chosen to be the square root of half the total number of metrics or the base-10 logarithm of the number of metrics. In some implementations, LDA is run greedily with multiple numbers of groups, and the number that maximizes a likelihood function (which is part of LDA) is chosen. The likelihood represents how well the groups describe the data, with a penalty term for having too many groups—this is called the BIC or AIC (Bayesian Information Criteria/Akaike Information Criteria). For more information, see "How does one determine the number of clusters that are hidden in a given data set?" available at http://www.quora.com/How-does-one-determine-the-number-of-clusters-that-are-hidden-in-a-given-data-set, retrieved Jan. 21, 2015, the entire disclosure of which is incorporated by reference.

At 1320 control determines the most significant members for a first one of the N groups. For each binary one value of each metric, the sample is assigned to the group for which it has the highest probability. For each group, the overall probability of each metric belonging to the group is computed. This computation may be performed by summing over all one-valued samples that were assigned to that group.

The metrics are then ranked within the group based on the computed probabilities. Metrics are chosen if their probability of belonging to the group is greater than a threshold. The threshold may be dynamic, such as a percentage of the probability of the metric having the highest probability. For example, if the highest probability of any of the metrics belonging to the group is 0.9 and a predefined percentage is fifty percent, other metrics having at least a probability of 0.45 of belonging to that group will be included.

At 1324 control determines whether there are additional groups to evaluate. If so, control transfers to 1328; otherwise, control continues at 1332. At 1332 control outputs a graph of group IDs and metrics linked to those IDs. The metrics linked to a group ID are those metrics which satisfied the probability threshold. Note that a single metric may be assigned to multiple groups. Control then ends.

Additional information on large-scale metric anomaly analysis can be found in U.S. Provisional Application No. 62/083,850, filed on Nov. 24, 2014, the entire disclosure of which is hereby incorporated by reference.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
a windowing circuit configured to divide, for each metric of a plurality of metrics, time series data for values of the metric into a plurality of time series portions, each corresponding to a respective window of time;
a hash circuit configured to calculate a hash value for each of the time series portions for each of the plurality of metrics;
a candidate identification circuit configured to (i) compare the hash values for each pair of metrics from the plurality of metrics, (ii) for a selected pair of metrics, count for how many windows of time the hash values of the selected pair of metrics are equal to each other, and (iii) identify the pair of metrics as a candidate pair in response to the count exceeding a threshold;
a metric relationship graph creation circuit configured to selectively create a first edge in a graph based on the candidate pair of metrics, wherein (i) each metric of the plurality of metrics is a node in the graph and (ii) direct relationships between each pair of the plurality of metrics are edges in the graph;
an anomaly combination circuit configured to detect an anomaly condition based on the graph; and
a conditioning circuit logically positioned prior to the windowing circuit and configured to:
apply a low-pass filter to the time series data for the metrics,
wherein the low-pass-filtered time series data is divided into the plurality of time series portions by the windowing circuit.

2. The system of claim 1 further comprising a correlation circuit configured to compute a similarity value between the candidate pair of metrics.

3. The system of claim 2 wherein the similarity value is one of a Euclidean distance, a hamming distance, a cosine distance, and a correlation coefficient.

4. The system of claim 2 wherein the metric relationship graph creation circuit is configured to only create the first edge in the graph in response to the similarity value exceeding a threshold.

5. The system of claim 2 further comprising:
a stacked autoencoder circuit configured to (i) train a stacked autoencoder using each of the time series portions of each of the plurality of metrics and (ii) identify output nodes in the stacked autoencoder activated by each of the time series portions of each of the plurality of metrics;
a concatenation circuit configured to, for each of the plurality of metrics, concatenate a representation of the identified output nodes for each of the time series portions of the metric;
a similarity identification circuit configured to compare each possible pair of the plurality of metrics based on the concatenated representation for each of the plurality of metrics, wherein the similarity identification circuit only computes a similarity value for a pair of metrics if a preliminary indication of the similarity value exceeds a first threshold; and
a combination circuit configured to, for a selected pair of metrics, combine the similarity value from the similarity identification circuit with the similarity value from the correlation circuit to create an overall similarity value,
wherein the metric relationship graph creation circuit is configured to create the first edge in the graph only when the overall similarity value exceeds a second threshold.

6. The system of claim 5 wherein the combination circuit is configured to create the overall similarity value by averaging the similarity value from the similarity identification circuit with the similarity value from the correlation circuit.

7. The system of claim 1 wherein the windows of time are equal in length.

8. The system of claim 1 wherein the hash circuit computes hash values using locality-sensitive hashing.

9. The system of claim 1 wherein the conditioning circuit is configured to:
remove long-term trends from the low-pass-filtered time series data for the metrics;
in connection with removing the long-term trends:
determine, using minimum mean squared error, a best fit line for the low-pass-filtered time series data and based on the best fit line, adjust the low-pass-filtered time series data; and
using a fast Fourier transform (FFT), transform the low-pass-filtered series data into an FFT signal.

10. The system of claim 9 wherein the conditioning circuit is further configured to normalize the time series data for the metrics.

11. The system of claim 1 wherein the graph is undirected.

12. A system comprising:
a windowing circuit configured to divide, for each metric of a plurality of metrics, time series data for values of the metric into a plurality of time series portions, each corresponding to a respective window of time;
a stacked autoencoder circuit configured to (i) train a stacked autoencoder using each of the time series portions of each of the plurality of metrics and (ii) identify output nodes in the stacked autoencoder activated by each of the time series portions of each of the plurality of metrics;
a concatenation circuit configured to, for each of the plurality of metrics, concatenate a representation of the identified output nodes for each of the time series portions of the metric;
a similarity identification circuit configured to compare each possible pair of the plurality of metrics based on the concatenated representation for each of the plurality of metrics, wherein the similarity identification circuit only computes a similarity value for a pair of metrics if a preliminary indication of the similarity value exceeds a first threshold;
a metric relationship graph creation circuit configured to selectively create a first edge in a graph based on a pair of the plurality of metrics whose similarity value exceeds a second threshold, wherein (i) each metric of the plurality of metrics is a node in the graph and (ii) direct relationships between each pair of the plurality of metrics are edges in the graph; and
an anomaly combination circuit configured to analyze an anomaly condition based on the graph.

13. The system of claim 12 wherein the first threshold and the second threshold are equal.

14. A method comprising:
conditioning, by a processor, time series data for each metric of a plurality of metrics by applying a low-pass filter to the time series data for each metric;
dividing, by the processor, for each metric of the plurality of metrics, the low-pass-filtered time series data for values of the metric into a plurality of time series portions, each corresponding to a respective window of time;

calculating, by the processor, using locality-sensitive hashing, a hash value for each of the time series portions for each of the plurality of metrics;

comparing, by the processor, the hash values for each pair of metrics from the plurality of metrics;

for a selected pair of metrics, counting, by the processor, for how many windows of time the hash values of the selected pair of metrics are equal to each other;

identifying, by the processor, the pair of metrics as a candidate pair in response to the count exceeding a threshold;

selectively creating, by the processor, a first edge in a graph based on the candidate pair of metrics, wherein (E) each metric of the plurality of metrics is a node in the graph and (ii) direct relationships between each pair of the plurality of metrics are edges in the graph; and detecting, by the processor, an anomaly condition based on the graph.

15. The method of claim 14 further comprising, by the processor, computing a first similarity value between the candidate pair of metrics.

16. The method of claim 15 wherein the first similarity value is one of a Euclidean distance, a hamming distance, a cosine distance, and a correlation coefficient.

17. The method of claim 15 wherein the first edge is only created in the graph in response to the first similarity value exceeding a threshold.

18. The method of claim 15 further comprising:

training, by the processor, a stacked autoencoder using each of the time series portions of each of the plurality of metrics;

identifying, by the processor, output nodes in the stacked autoencoder activated by each of the time series portions of each of the plurality of metrics;

for each of the plurality of metrics, concatenating, by the processor, a representation of the identified output nodes for each of the time series portions of the metric;

comparing, by the processor, each possible pair of the plurality of metrics based on the concatenated representation for each of the plurality of metrics;

computing, by the processor, a second similarity value for a pair of metrics only if a preliminary indication of the second similarity value exceeds a first threshold;

for a selected pair of metrics, combining, by the processor, the first similarity value with the second similarity value to create an overall similarity value; and creating, by the processor, the first edge in the graph only when the overall similarity value exceeds a second threshold.

19. The method of claim 18 wherein the overall similarity value is created by averaging the first similarity value and the second similarity value.

20. The method of claim 14 wherein the windows of time are equal in length.

21. The method of claim 14 wherein the hash values are computed, by the processor, using locality-sensitive hashing.

22. The method of claim 14 further comprising applying, by the processor, a low-pass filter to the time series data for the metrics and removing, by the processor, long-term trends from the time series data for the metrics.

23. The method of claim 22 further comprising normalizing, by the processor, the time series data for the metrics.

24. The method of claim 14 wherein the graph is undirected.

25. A method comprising:

dividing, by a processor, for each metric of a plurality of metrics, time series data for values of the metric into a plurality of time series portions, each corresponding to a respective window of time;

training, by the processor, a stacked autoencoder using each of the time series portions of each of the plurality of metrics;

identifying, by the processor, output nodes in the stacked autoencoder activated by each of the time series portions of each of the plurality of metrics;

for each of the plurality of metrics, concatenating, by the processor, a representation of the identified output nodes for each of the time series portions of the metric;

comparing, by the processor, each possible pair of the plurality of metrics based on the concatenated representation for each of the plurality of metrics;

computing, by the processor, a similarity value for a pair of metrics only if a preliminary indication of the similarity value exceeds a first threshold;

selectively creating, by the processor, a first edge in a graph based on a pair of the plurality of metrics whose similarity value exceeds a second threshold, wherein (i) each metric of the plurality of metrics is a node in the graph and (ii) direct relationships between each pair of the plurality of metrics are edges in the graph; and analyzing, by the processor, an anomaly condition based on the graph.

26. The method of claim 25 wherein the first threshold and the second threshold are equal.

* * * * *